United States Patent [19]

Chase

[11] 4,313,726
[45] Feb. 2, 1982

[54] ENVIRONMENTAL FOG/RAIN VISUAL DISPLAY SYSTEM FOR AIRCRAFT SIMULATORS

[75] Inventor: Wendell D. Chase, Saratoga, Calif.

[73] Assignee: The United States of America as represented by the Administrator of National Aeronautics and Space Administration, Washington, D.C.

[21] Appl. No.: 53,566

[22] Filed: Jun. 29, 1979

[51] Int. Cl.³ .............................................. G09B 9/08
[52] U.S. Cl. ......................................... 434/42; 434/43
[58] Field of Search ................... 35/12 N; 272/15, 17; 73/150, 432 SD; 239/14, 101, 102, 99, 339, 369, 566, 567; 273/DIG. 28; 434/38, 41, 42, 43, 44

[56] References Cited

U.S. PATENT DOCUMENTS

| | | | |
|---|---|---|---|
| 2,492,969 | 1/1950 | Crane | 35/12 N |
| 2,703,488 | 3/1955 | Gevantman et al. | 73/432 SD |
| 3,327,536 | 6/1967 | Fitzgerald | 73/432 SD |
| 3,436,840 | 4/1969 | Noxon | 434/36 |
| 3,524,019 | 8/1970 | Coen | 434/41 X |
| 3,548,515 | 12/1970 | Simon | 434/36 |
| 3,620,592 | 11/1971 | Freeman | 434/44 X |
| 3,949,490 | 4/1976 | Derderian et al. | 434/44 |
| 4,044,297 | 8/1977 | Nobue et al. | 239/102 X |
| 4,055,004 | 10/1977 | Chase | 35/12 N |
| 4,174,836 | 11/1979 | Kearney | 273/DIG. 28 |
| 4,194,689 | 3/1980 | Ash | 239/14 |

Primary Examiner—William H. Grieb
Attorney, Agent, or Firm—Darrell G. Brekke; John R. Manning

[57] ABSTRACT

An environmental fog/rain visual display system for aircraft simulators comprising a combination of electronic and mechanical integrated elements which operate together to produce realistic environmental conditions that would actually be encountered by a pilot flying an aircraft. The electronic elements of the system include a real time digital computer, a calligraphic color display which simulates landing lights of selective intensity, and a color television camera for producing a moving color display of the airport runway as depicted on a model terrain board. The mechanical simulation elements of the system include an environmental chamber which can produce natural fog, nonhomogeneous fog, rain and fog combined, or rain only. The environmental chamber is positioned between the color scene produced by the television camera and calligraphic color display and the windscreen of the teaching aircraft cockpit. Thus, a pilot looking through the aircraft windscreen will look through the fog and/or rain generated in the environmental chamber onto a viewing screen with the simulated color image of the airport runway thereon, and observe a very real simulation of actual conditions of a runway as it would appear through actual fog and/or rain. The density of the fog in the environmental chamber can be rapidly increased or decreased to simulate the fog gradients typically experienced at the time of takeoff or landing.

30 Claims, 20 Drawing Figures

METHOD FOR DETERMINING TERMINAL AREA VISIBILITY CONDITIONS

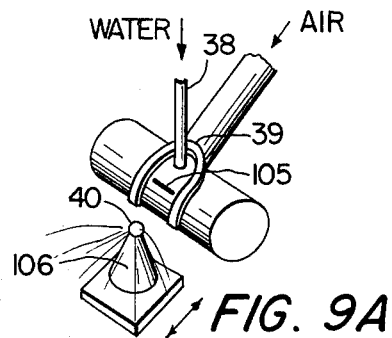
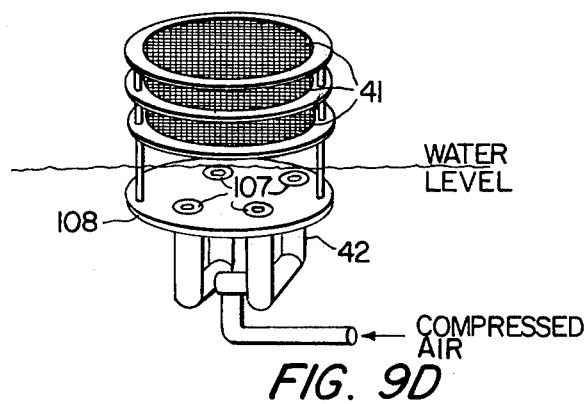
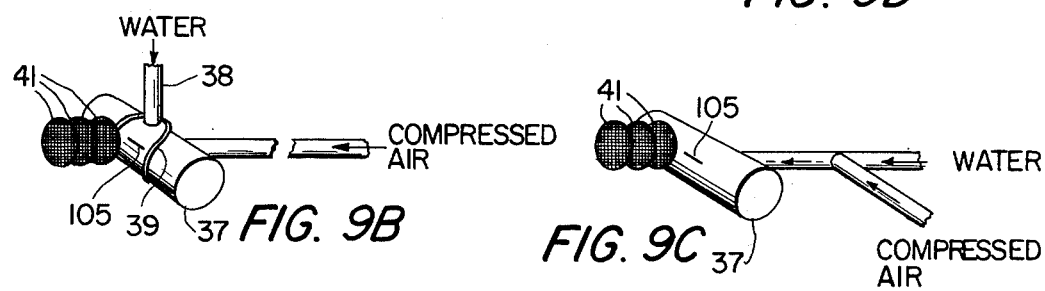
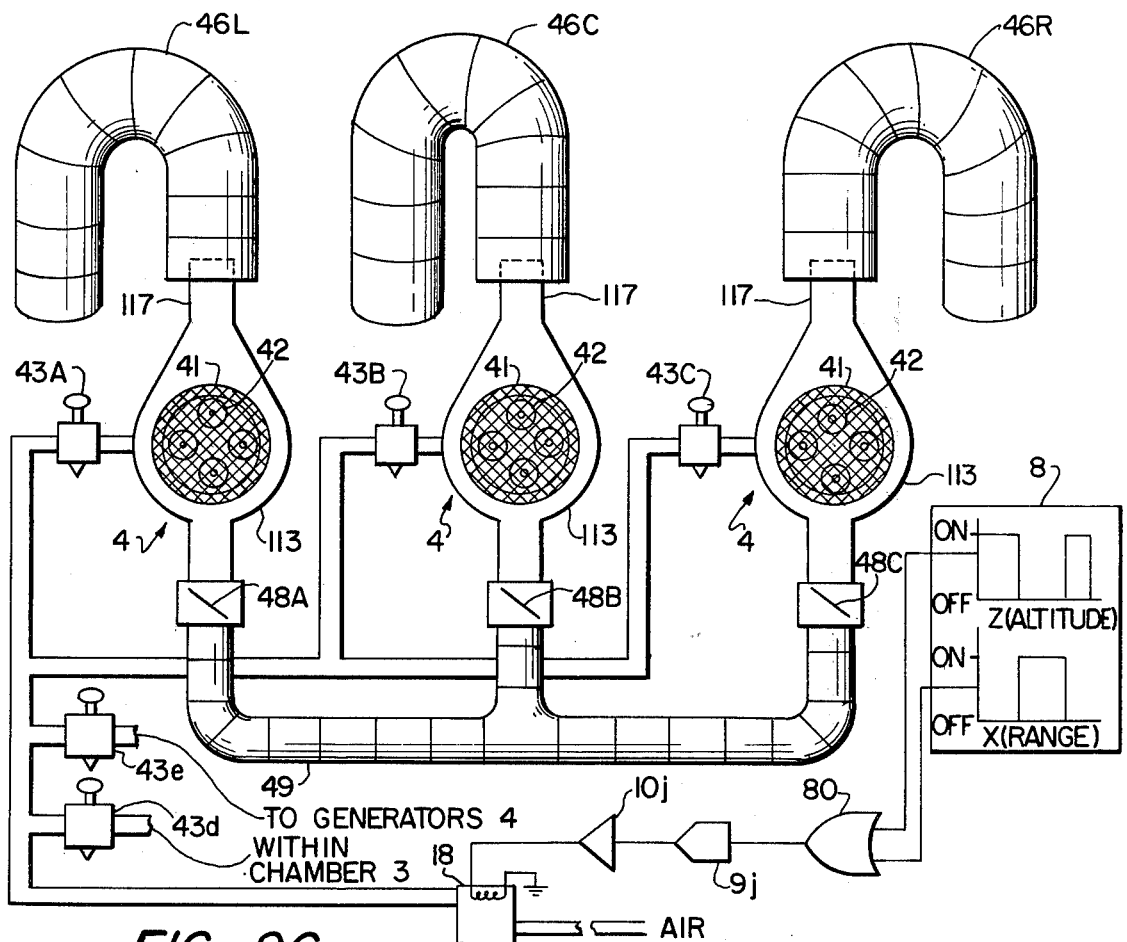

VEILING EFFECT DUE TO AMBIENT LIGHT UPON FOG

ENVIRONMENTAL FOG/RAIN VISUAL DISPLAY SYSTEM FOR AIRCRAFT SIMULATORS

ORIGIN

The invention described herein was made by an employee of the U.S. Government, and may be manufactured and used by or for the Government for Governmental purposes without payment of any royalties thereon or therefore.

BACKGROUND OF THE INVENTION

1. Field Of The Invention

The present invention relates to an environmental condition simulator for teaching pilots how to land and take-off aircraft under adverse weather conditions. More specifically, the present invention relates to an environmental condition simulator for accurately and realistically generating fog and rain conditions which will be observed by a pilot during takeoff and landing of an aircraft.

2. Description Of The Prior Art

All aircraft require some form of runway to perform either a landing or takeoff phase maneuver. Usually these maneuvers are monitored by strict Federal Aviation Administration (FAA) policies and procedures which govern the use of both the airspace and the airport runway facilities. The operation of aircraft, which are allowed to fly through an approved airspace and which are granted certain landing privileges, are monitored by the FAA by means of a flight plan. The major factors which cause both the pilot and FAA to modify this flight plan are primarily meteorological conditions. These conditions may be local and hence prevent both takeoff and landings, or they may occur enroute forcing the pilot to attempt to land at an approved alternate runway.

During the time since commercial aviation has scheduled flights for both passengers and freight, the major factor which has influenced operational costs of the above services, has been the environmental meteorological conditions. This factor also has the greatest influence in the struggle for the aircraft, passengers and freight to arrive safely at the appointed destination. Since man has been virtually unable to alter the weather, his best attempt has been to devise instruments such as an autopilot or an autoland system which could enable a pilot to safely land his aircraft successfully in spite of the adverse weather conditions. However, it has been recognized that certain climatic conditions may be unfavorable to predict a safe landing as now determined by a classification of the airport conditions. Currently, the FAA monitors the visibility conditions during periods of rain, fog, or snow, and classifies the poorer visibility conditions as Category I, Category II, Category III (a, b, or c). Respectively, Category I allows the aircraft to descend to 200 feet altitude with a measured runway visual range (RVR) of 2600 feet; Category II—100 feet altitude decision height and a RVR of 1200 feet; Category III (a,b,c) are blind landing conditions with visibility sufficient only for taxiing along the surface of the runway.

Today, in spite of all the advanced weather radar devices onboard the aircraft, cockpit instrumentation, and ground aids such as Visual Approach Slope Indicators (VASI), as well as improved approach lighting systems for low visibility final approaches, the critical problem remains that poor visibility is a major contributing factor toward most of the terminal landing approach accidents. It is therefore clear that there is a great need for reduced visibility conditions of sufficient realism to induce pilot apprehensions and reactions just before touchdown.

The aircraft industry, both civilian and military, is attempting to train their pilots through the use of simulators with visual flight attachments. Their training goal has been to reduce the overall operational aircraft flight costs. However, what has been neglected in most cases is the need to establish an adequate low visibility training program, which would allow the pilots to make better decisions in regard to the various categories of visibilities which they may encounter along the final approach path. It has been well recognized that the most crucial area of the final approach has been from the last 1000 feet altitude and 3-4 mile range. Providing that the visibility is good, the pilot usually will fly the remainder of the flight viewing the runway through the windscreen after passing through the appropriate decision height. During the pilot's normal descent he may encounter various adverse weather conditions such as fog, patchy fog, rain, or rain down-burst cells, all of which cause intermittent and extremely dangerous obscuration of the runway. Presently, there have not been any simulation devices which would adequately and realistically represent all of the above environmental conditions.

The current and most widely used technique for generating low visibility scenes for piloted operations now in use extensively throughout the world has been the utilization of an electronic fog generator device. This system operates basically from the modification of red, green, and blue video signals which originate from a color television camera and terminate at the color monitor. Several extraneous signals, pitch, roll and range are sent to the fog generator so as to provide synchronization and correct alignment of a fog video overlay with the horizon and ground view presented on the monitor. The resulting scene as viewed by the pilot through his windscreen is that of a semi-transparent shade drawn over the original television runway terrain model scene. The characteristic simulated fog reproduced in this manner is homogeneous over the primary television display scene.

Another technique for producing poor visibility in aircraft simulators was performed with an optical wedge which disturbed the light sensed by the television camera sensors. This approach was used by General Precision Systems (now Redifon) who inserted a servo controlled optical wedge in the light path of the optical probe. By raising or lowering this optical wedge the light transmission and hence the video output of the television camera was changed. The effect as viewed by the pilot was a scene of reduced brightness and contrast supposedly representative of a homogeneous reduced visibility.

The University of California at Berkeley, under the sponsorship of the FAA, constructed a large building (circa 1966) in which fog particulate was produced for the study of airport lighting systems. A 1/10th scale lighted runway was constructed and enclosed in a building approximately 1000 feet long. An overhead cable was raised about 25 feet above the ground and an aircraft mock-up was attached to this cable. Fog spray was injected into this building, the cab was then released to travel about 3 miles per hour down the suspended cable, and the observers in the cab descended thru the fog toward the 1/10th scale lighted runway. This facility did not provide any capability for providing the pilot with aircraft controls or instruments other than the one open loop cable over which the suspended cab traveled. To set up the visibility conditions for the various Category I, II, or III situations with the different lighting arrangements, the fog nozzles were activated until readings taken from a transmissometer indicated the appropriate scaled readings. At this time the fog nozzles were manually turned off and the fog remained suspended until it naturally dissipated some twenty to forty minutes later.

U.S. Pat. No. 3,436,840 to Noxon discloses another known fog simulator for training pilots. In the system of Noxon the fog is optically simulated with a wedge lamp, wedge filter and minor lamps to maintain known ratios of image brightness to fog densities. However, there is no actual generation of fog or rain in the system of Noxon.

Another electronic fog generator system is described in U.S. Pat. No. 3,524,019 to Coen. Coen discloses a fog simulator in a visual display system in which television is used to generate images. The device introduces fog effect which takes into account direction of the apparent line of sight of the aircraft. The Coen patent does not disclose the use of natural fog and/or rain chambers.

U.S. Pat. No. 3,548,515 to Simon discloses an optical day and night fog simulator for use in aircraft. The fog simulator causes an outside image to be brought into the system through telescopic optics which passes through a photographic film having a variable density to a diffuser to form a real image thereon, together with a halo of light about the image. A collimated lens system transforms the real image, together with the halo of light into a collimated beam which the pilot may view by means of a front surface mirror as a nightime or daytime fog simulation. The Simon patent does not disclose the use of natural fog and/or rain chambers.

Other prior art systems are known which are of general interest with respect to some of the separate components of the system of the present invention.

For example, U.S. Pat. No. 3,620,592 to Freeman discloses an attachment for flight simulators for producing a head-up display.

U.S. Pat. No. 2,703,488 to Gevantiman et al discloses a fog mist chamber for performing environmental tests other than in flight simulators.

U.S. Pat. No. , 3,327,536 to Fitzgerald discloses an environmental testing chamber for accelerated weather conditions including a water spray. The Fitzgerald patent does not disclose the use of the test chamber in combination with a flight simulator.

All of the fog/rain simulators for aircraft teaching devices mentioned heretofore suffer from the following disadvantages.

Electronic fog generator systems when presented with raster television displays produce a homogeneous type raster fog that is not representative of any actual known fog conditions. Natural fog contains sections which are more dense than others and may move in slightly different directions with respect to each other.

Electronic fog systems cannot produce the correct fog physics such as a halo effect around a light, nor reproduce the correct absorption or scattering properties. Furthermore, color spectrum shifts due to the presence of actual fog or rain cannot be reproduced with electronic fog.

Electronic fog systems cannot produce the effect of rain upon the windscreen nor the distortions of the outside visual scene as perceived by the pilot.

Electronic fog systems cannot produce a veiling luminance effect which is present under natural daylight conditions. This veiling effect makes the fog appear more dense when illuminated with ambient sunlight.

Electronic fog systems are presented at optical infinity or in the same image planes as the landing display scene. Hence, the pilot will visually accommodate his eyes at infinity or exactly opposite the accommodation reflex that occurs with natural fog, whereby the pilot will accommodate to the windscreen area and then shift to the far field when the scene can be perceived.

Electronic fog systems cannot produce a night-time fog scene such as would occur with real fog. Real fog at night has an RVR which is about twice that for day RVR. Thus, colored lights at night may be seen at about twice the distance than that for the same day RVR. Furthermore, the light intensities at night of the runway, approach path, and surrounding airport area in the presence of low fog or rain visibility factors cannot be reproduced electronically. Color shifts and halo effects as well as other distortions due to the presence of rain or rain and fog combined cannot be done electronically.

Electronic fog systems cannot produce the effect of an aircraft passing through non-homogeneous rain cells for either day or night flight operations.

Electronic fog systems are made to alter the normal red, green, and blue video signals in order to produce a simulated low visibility condition. However, most aircraft utilize a windshield wiper blade to remove fog condensate or rain drops from the aircraft windscreen. The wiper blade performs the task of momentarily removing the film of water and thus the pilot may see an undistorted scene for a fraction of a second. Other classes of aircraft utilize air blown systems to remove water from the windscreen. In both cases with either a wiper blade or a wind blown system, distortions or aberrations are present on the windscreen which cannot be reproduced electronically.

Optical wedges located within the optical probe of terrain model television systems produce the same disadvantages as described above with respect to the electronic fog systems.

Television terrain model systems characteristically utilize a raster which is converted to a video signal as the raster sweeps from the top left to the bottom right of the camera tube and display monitor. Raster driven displays, either computer or television generated, control the movement of an electron beam and its brightness by means of signals sent to the respective horizontal and vertical deflection coils, and the video amplifier. The problem which exists for low visibility simulations with these types of raster displays, is that the monitor is made to make the scene uniformly bright from top to bottom. Since aircraft simulators with visual flight attachments present a horizon within the display scene, it would be realistically appropriate to make each individual object and hence its brightness from the horizon to the bottom of the display obey the laws of physics for which the brightness will be increased toward the bottom of the monitor by the ratio of one over the distance squared from the pilot to the object. When this factor is taken into account, the scene would be in more agreement with what would normally be perceived by the pilot whereby the bottom of the display would appear brighter and elements close to the horizon would appear dimmer in low visibility operations. Currently no compensation for this fall off in scene brightness has been corrected for, especially when used in conjunction with electronic fog systems.

The Berkeley Fog Chamber, discussed hereinbefore, produced fog in a narrow and long building. Inside this building was a 1/10 scale model lighted runway with approach lights. An unconventional cab was suspended by an overhead cable and allowed to descend down this cable toward the scaled runway at about 2–5 miles per hour. This facility did not have the following: (1) control of the fog to raise or lower the visibilities rapidly (1–2 sec or less) for various types of breakout; (2) ability to rapidly change fog density as would be encountered when actually flying thru clouds; (3) the cab was constrained to only one degree of freedom motion along the scaled runway centerline, and no other motions were present; (4) no other preprogrammed trajectory could be flown; (5) there was no provision for piloted closed loop control required for automatic landings subject to manual takeover decisions by the pilot; (6) no provision for cabin intruments; (7) approach speed toward the scaled runway was very unrealistic; (8) the pilot's eye correct height above the ground after touchdown was not accounted for correctly which would normally present different final approach and taxiing problems for large commercial aircraft.

SUMMARY OF THE INVENTION

Accordingly, it is a primary object of the present invention to provide an aircraft simulator which generates actual fog and/or rain adjacent the windscreen of an aircraft cockpit to realistically simulate the actual visibility conditions encountered by an aircraft passing through fog and/or rain.

It is another object of the present invention to provide a means for generating natural fog of variable densities corresponding to environmental conditions defined by standard visual flight rules (VFR), and measured runway visual range (RVR).

It is still another object of the present invention to provide a means for generating fog which accurately simulates the appearance of fog during both day and night flight operations.

It is a further object of the present invention to provide an aircraft simulator system wherein the halo effects around individual runway landing lights will be accurately and realistically depicted.

It is still a further object of the present invention to provide an aircraft simulator which accurately recreates the veiling luminance effect experienced in clouds or fog in daytime flying as well as night-time flying when lightning is encountered.

It is yet another object of the present invention to provide a realistic display of fog and/or rain characteristics at each window of an aircraft simulator cockpit so that a pilot can perform multiple trajectories with simulator motion capability and can complete both manual or automatic closed loop flight manuevers under all visibility conditions.

It is still another object of the present invention to provide a rain generator in the aircraft simulator of the present invention, wherein the rain intensity and density effect can be varied as if the aircraft were passing through several very hazardous downburst cells.

It is still a further object of the present invention to provide an aircraft simulator which utilizes actual windshield wipers in combination with the natural fog and/or rain to accurately illustrate to the pilot in the simulator cockpit the water removing characteristics of the wipers.

It is yet another object of the present invention to provide a unique control system which will very rapidly remove fog from the environmental chamber of the simulator as if the aircraft were suddenly breaking out of a fog bank.

It is still another object of the present invention to provide a control system for directing rain against the simulator windscreen at different angles and different velocities to create realistic rainfall conditions.

It is a further object of the present invention to provide a rain generation system which can produce continuous rain, rain squalls, and down burst rain cells.

It is still a further object of the present invention to provide an aerosol generating system wherein the particle size of the liquid can be controlled to produce fog or cloud-size particulates.

It is yet another object of the present invention to provide an aircraft simulator system which allows the pilot to observe a normal depth-cueing due to the change of brightness of scene elements which must occur as a function of both range and altitude to the runway.

It is still another object of the present invention to provide means for incorporating a head-up display in combination with the environmental fog/rain chamber of the present invention.

The objects of the present invention are achieved by providing in combination an environmental effects chamber in which fog and/or rain is produced in combination with a cathode ray tube color system display. For example, the environmental fog and/or rain generation chamber of the present invention may be utilized in combination with the "Full Spectrum Computer Generated, Calligraphic Monitor" which is described in U.S. Pat. No. 4,055,004 issued to the present inventor Wendell D. Chase on Oct. 25, 1977. This device presents a nightime scene to the pilot with a full range of spectral colors, particularly red, orange, yellow, blue, blue-green, green and white that cannot be produced by other calligraphic display devices. The resulting scene, when used with the fog/rain environmental effects chamber of the present invention has been highly effective in presenting to the pilot the correct visual scene physics normally encountered in limited visibility landing approach maneuvers. Of course other television systems and calligraphic displays may be utilized with the fog/rain environmental effects chamber of the present invention without departing from the spirit and scope thereof.

A pilot sitting in the aircraft cockpit of the simulator system of the present invention will view through the windscreen of the cockpit a scene of an airport runway through actual fog. This fog can be viewed through any one of the aircraft simulator cockpit windows for which there are outside visual display scene attachments. The fog which is presented will be of a nonhomogeneous nature representative of that which occurs in a natural environment.

Control means are provided to simulate visibility conditions corresponding to Categories I, II, or III as established by the FAA. Other visibility conditions can be created as desired.

The system of the present invention consists of a combination of electronic and mechanical integrated elements which operate together to produce realistic environmental conditions that would be encountered by a pilot flying an aircraft. The electronic components include a real time digital computer, a calligraphic color display generator, and a conventional visual simulation television attachment. An environmental effects chamber for producing natural fog and/or rain is provided adjacent the windscreen of the aircraft simulator cockpit so that the calligraphic color display and the television display are viewed through the natural fog and/or rain.

The present invention also provides novel control systems for varying the density of fog generated in the environmental effects chamber and the velocity, duration, and direction of rain generated in the environmental effects chamber to simulate actual flight conditions encountered by an aircraft passing through inclement weather.

The object and further scope of applicability of the present invention will become more readily apparent from the detailed description of the drawings given hereinafter. It should be understood, however, that the detailed description and specific examples, while indicating preferred embodiments of the invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description hereinbelow and the accompanying drawings which are given by way of illustration only and thus, are not limitative of the present invention and wherein:

FIGS. 9A to 9D disclose four alternative embodiments for supplying fog or cloud particulate to the environmental chamber of the present invention;

FIG. 9G is a schematic illustration showing how air to the aerosol generators is supplied and controlled;

DETAILED DESCRIPTION OF PREFERRED EMBODIMENTS

General System Description

Figure 1:
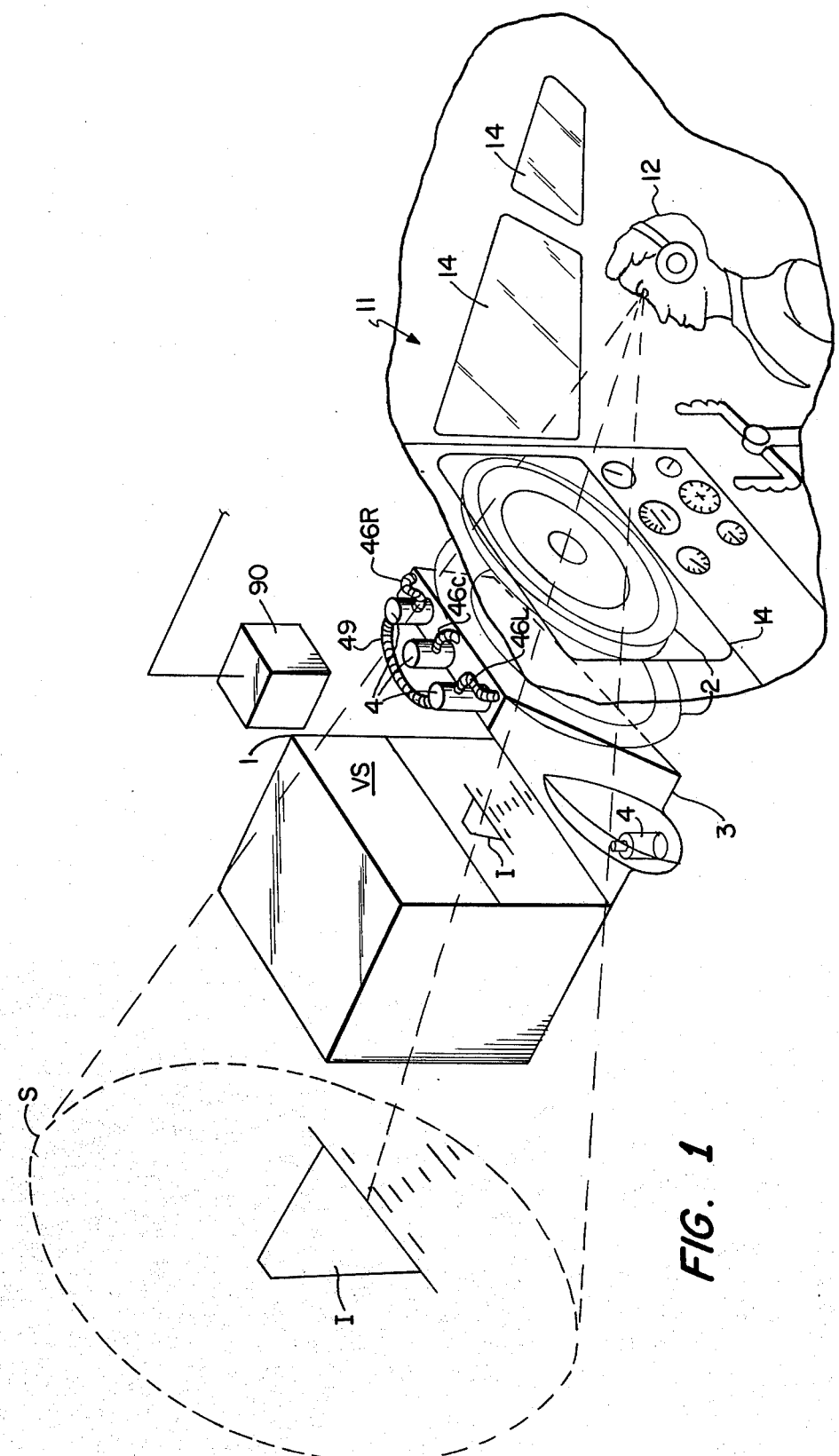
FIG. 1 is a perspective view of the arrangement of the component parts of the present invention.

Referring in detail to FIG. 1 there is illustrated a general arrangement of the component parts of the system of the present invention. The components illustrated may be integrated into most fixed base or moving base aircraft simulators in use today.

As illustrated in FIG. 1 a pilot 12 sitting in an aircraft simulator cockpit 11 is surrounded by a plurality of windscreens 14. As will become more readily apparent hereinafter by reference to FIGS. 2A and 2B the simulator system of the present invention may be positioned at each of the windscreens 14. However, for simplicity and the sake of clarity of explanation only one such simulator system is depicted in FIG. 1. This simulator system includes a pair of plano-convex 25-inch focal length lens 2 positioned in windscreen 14. Adjacent the lens pair 2 is an environmental effects chamber 3, which contains aerosol fog generators 4, means for purging the chamber of fog, rain generating means, and windshield wipers. The purging means, rain generating means, and windshield wipers are not illustrated in FIG. 1 for the sake of simplicity but are illustrated in FIGS. 4, 6, 7, and 8, to be described hereinafter. At the rear side of environmental effects chamber 3 is provided a cathode ray display or tube monitor 1. This cathode ray display tube or monitor may be of the type disclosed in U.S. Pat. No. 4,055,004 issued to Wendell D. Chase on Oct. 25, 1977. However, other types of cathode ray tube displays may be utilized if desired. A lamp 90 between monitor 1 and chamber 3 generates daylight spectra. When an image I is generated on viewing screen VS of monitor 1, pilot 12 visualizes it in simulated scene S through the fog and/or rain generated in environmental effects chamber 3 and the light from lamp 90. Thus, a very realistic simulation of actual flying conditions is achieved.

Figure 2A:
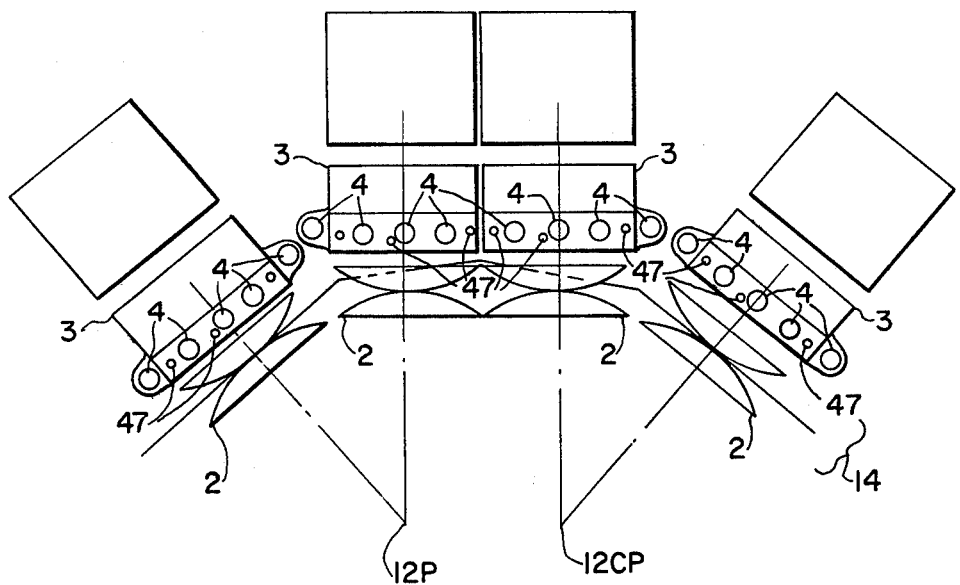
FIG. 2A is a top plan view illustrating a plurality of simulator devices of the present invention disposed adjacent a plurality of windows of an aircraft simulator cockpit.

FIG. 2A shows the arrangement of the components of FIG. 1 for a multiwindscreen aircraft cockpit from which a command pilot 12P normally occupies the left-hand seat and a copilot 12CP occupies the right-hand seat.

Figure 2B:
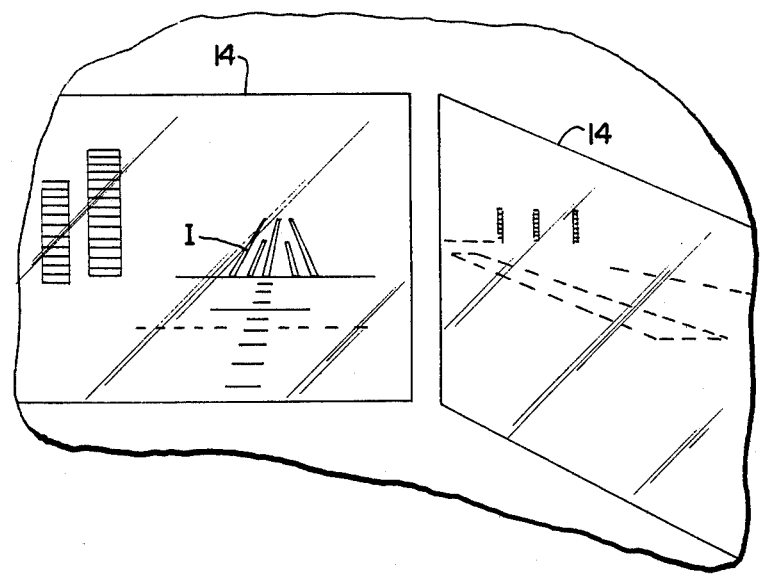
FIG. 2B is a typical view through the windscreens as seen by a pilot in the system depicted in FIG. 2A.
Figure 3:
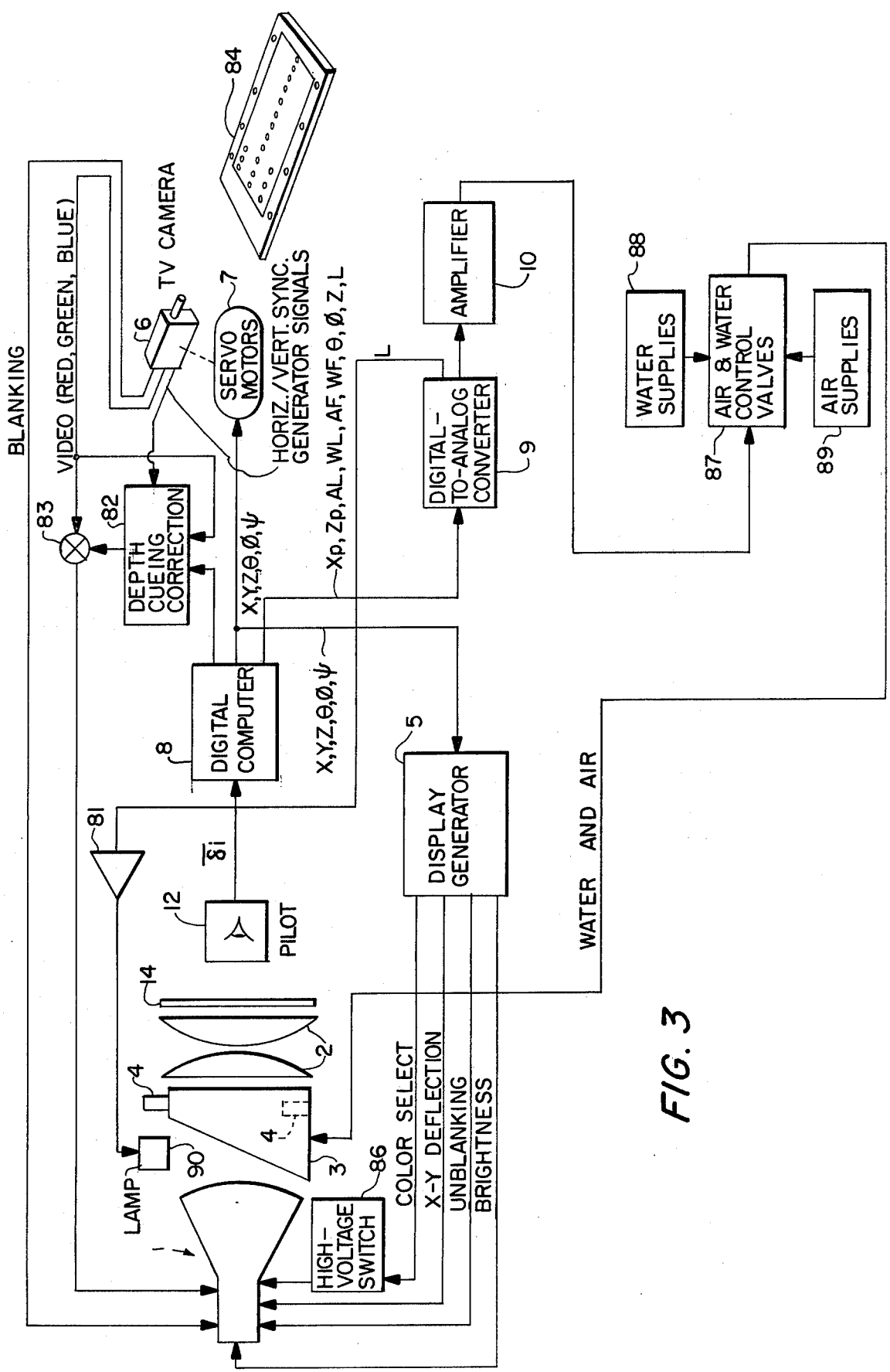
FIG. 3 is a diagrammatic illustration of the digital control system for operating the aircraft simulator system of the present invention.
Figure 4:
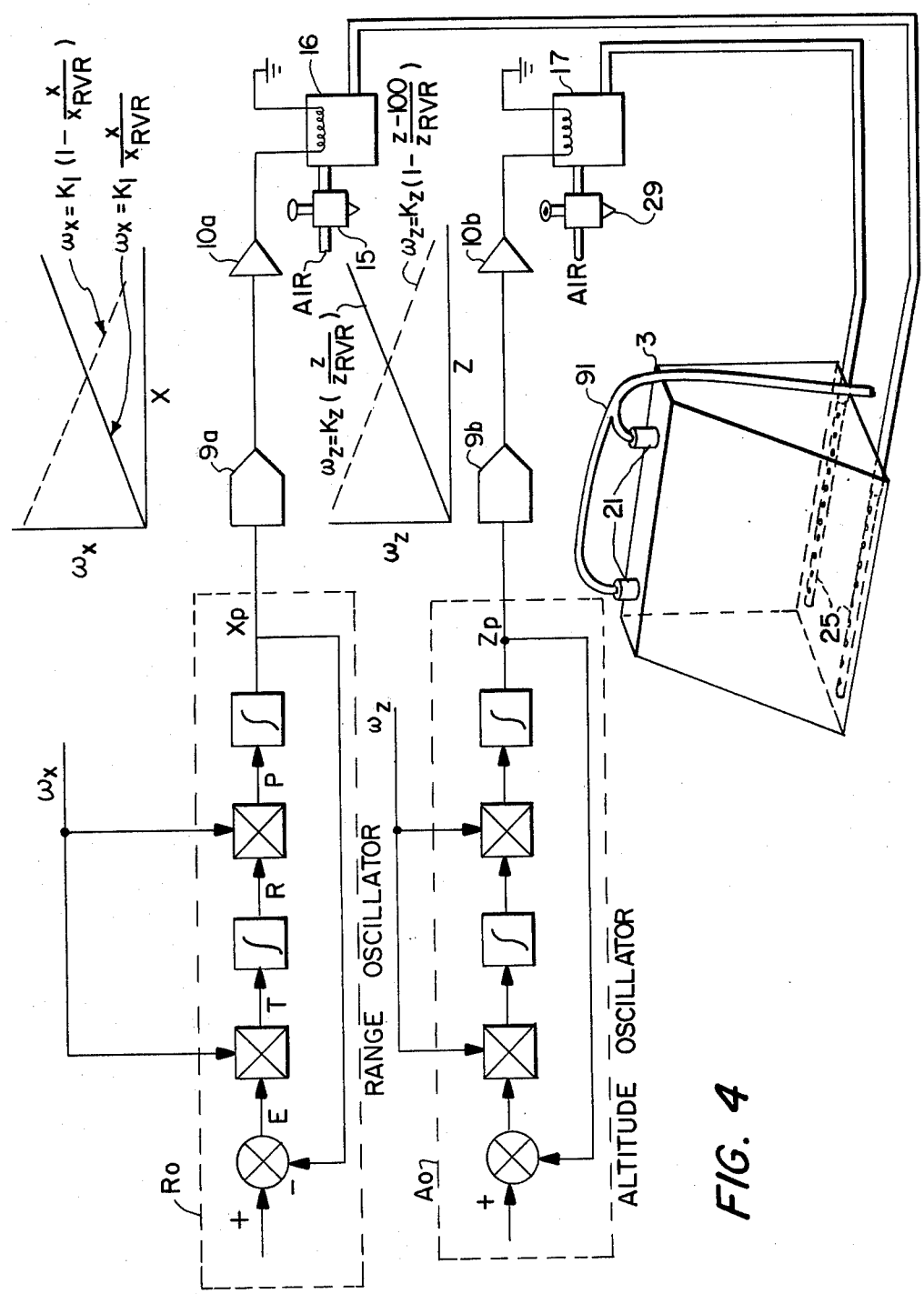
FIG. 4 is a diagrammatic view of a control system for purging fog from the environmental effects chamber in the system of the present invention.

The pilots 12P and 12CP will position themselves with their eyes located in the center of the collimating lens 2 at a distance of about 25 inches and will view a combined scene similar to that shown in FIG. 2B. The portion of the scene depicting a runway will be an erect virtual image I created from the position of the monitor located in the focal plane of the collimating lens 2. The fog which is injected into the environmental effects chamber 3 and which is formed by the aerosol generators 4, and provides ambient veiling luminance by lamps 90 positioned above the chamber as shown in FIG. 3, will tend to fill the space between the face of the collimating lens 2 and the face VS of the monitor 1. The fog positioned in this space will be both collimated for particulate near the monitor 1, and uncollimated for other than particulate near the lens 2.

FIG. 3 illustrates an electronic control schematic for the components of FIGS. 1 and 2. A digital computer 8 is programmed with the dynamic flight characteristics of the aircraft to be simulated (a DC-9, a Boeing 747, or whatever). As pilot 12 moves the flight controls, signals δi are fed to computer 8 and position signals x, y and z, pitch, roll and yaw signals, $\theta$, $\Phi$ and $\Psi$, respectively, are simultaneously fed to a calligraphic display generator 5 and servo motors 7. Signals x, y and z represent aircraft distances in a rectangular coordinate system having three mutually perpendicular axes. Aircraft altitude is represented by z, aircraft range is represented by x, etc.

The light output of lamp 90 is a function of computer-generated altitude and is designated as signal L. Signal L is further amplified to the correct driving voltage by amplifier 81 before it drives lamp 90.

Cathode ray tube monitor 1 receives a video signal from TV camera 6 or calligraphic display generator 5. If desired, both video signals may be fed simultaneously to monitor 1. TV camera 6 is moved with respect to model terrain board 84 by servo motors 7 in accordance with the six-degrees-of-freedom signals x, y, z, $\theta$, $\Phi$, $\Psi$ generated by computer 8. Typically, board 84 will have a three-dimensional model of an aircraft landing field and the countryside surrounding it. Of course, as camera 6 nears the terrain board, the image on monitor 1 looms before pilot 12. Visual flight simulator systems with a TV camera, servo motor means for moving the camera and a terrain model are sold, for example by Redifon, Limited of England.

Calligraphic display generator 5 artificially generates a video signal symbolic of light sources. Typically, display generator 5 is employed to generate signals that appear on monitor 1 as airfield landing lights, airport building lights, lights on highways and buildings adjacent the airport, etc. Display generator 5 is fundamentally a computer that generates signals representative of a pattern of light sources. As the input signals x, y, z, $\theta$, $\Phi$, and $\Psi$ vary, the size and orientation of the pattern is appropriately changed. Suitable commercial units for display generator 5 are the Evans and Sutherland LDS-2 or Picture Systems I or Picture Systems II. When the instant invention is used to simulate landings under daylight conditions, display generator 5 is usually turned off (unless there are light sources in the scene). Conversely, when the invention is used to simulate nighttime landings, TV camera 6 is switched off and the sole video signal for monitor 1 is supplied by display generator 5. When it is desired to use the subject system for simulating landing during periods of low ambient light (such as at sunrise or twilight), both video sources (camera 6 and display generator 5) will usually be utilized. When the CRT monitor 1 is of the beam penetration variety, then the color select signal from display generator 5 must be used to control a conventional high-voltage switch 86. As the output voltage of switch 86 changes from one state to another, the output dot on monitor 1 changes color (from red to green or vice versa). Except when monitor 1 contains a beam penetration type CRT, the color select signal and switch 86 are unused.

Computer 8 also feeds signals x, z, $\theta$ and $\Phi$ to a TV raster scan depth cueing correction circuit 82 which causes the scene luminance to increase for each raster line from the horizon toward the bottom of the display. This satisfies the light intensity drop off with range and is used to correctly simulate the actual veiling effect produced by the presence of fog. The video signals from TV camera 6 are added to the output of depth cueing circuit 82 in summer 83, and the output of the summer is coupled to cathode ray tube display system 1 along with the blanking signal from camera 6. Digital signals Xp, Zp, AL, WL, AF, WF, $\theta$ and $\Phi$ from computer 8 are converted to an analog format by converter unit 9 and amplified by amplifier unit 10. The amplified signals control solenoid valves 87 which in turn admit pressurized water and air to environmental effects chamber 3 from supplies 88 and 89, respectively. It is this air and water that obscures the pilot's vision of monitor 1 and makes him feel that he is flying an aircraft through fog and rain. Computer 8 may be, for example, the Model SEL-840 Digital Computer manufactured by Systems Engineering Laboratory. There are numerous other commercial main frames that have the capacity to generate the necessary control signals.

Environmental Effects Chamber

The aerosol is fed into the environmental effects chamber 3 through auxiliary aerosol generators 4 on the top of chamber 3 as well as primary aerosol units 4 positioned internal to the chamber. Because of the chamber's small size needed to match the collimating optics field of view with respect to the size of the display monitor, and because of the unique shape needed to set up specific circulation patterns, it is essential to have some means for rapidly clearing the chamber so as to simulate the aircraft breaking out of the fog or clouds during day or night operations.

The apparatus for clearing the chamber is shown in FIG. 4. Along the bottom of the chamber are two tubes 25 located at the front and rear. The tubes are preferably made of copper and have 1/32" diameter orifices on the top that are spaced approximately one inch apart. On command, air is emitted from the tube orifices in order to clear the chamber of fog. When fog is generated by aerosol generators 4, a pressure $P_1$ is generated inside of chamber 3. In order to exhaust the fog from generator 3, the air emanating from tubes 25 must be at pressure $P_2$ where $P_2 > P_1$, and there must be a place for the liquid particles to exit. The larger the differential pressure between $P_1$ and $P_2$, the faster the aerosol will be cleared from the chamber. Input air from tubes 25 at $P_2$ is supplied in bursts in order to create mixing or turbulence inside chamber 3 and promote a uniform visual effect across the entire viewing area. As a result of the air bursts at $P_2$, air and liquid particles are forced out of chamber 3 through pressure relief valves 21 located atop chamber 3. Air from supply 89 is fed to valves 15 and 29. Valves 15 and 29 are coupled to d-c, two-way, normally-closed, solenoid valves 16 and 17, respectively. The pressure at the input of each solenoid valve is set at a level in excess of $P_1$. Solenoid 16, which is coupled to one tube 25, is driven by a d-c signal having a waveform $x_p$ that is a function of $(1-\cos\omega_x t)$. Solenoid 17 is coupled to the other tube 25 in chamber 3 and it is electrically driven by a d-c signal having a waveform $z_p$ that is a function of $(1-\cos\omega_z t)$. From a graph standpoint, these waveforms appear as a sinusoidal wave with the wave above the abscissa and the lower extremity at y=0.

Rain is simulated in the environmental effects chamber 3 by ejecting water and air from supplies 88 and 89 through a plurality of orifices at the front and rear of the chamber. Emission of air and water is controlled by solenoid valves similar to solenoid valves 16 and 17. All of these solenoid valves are controlled by identical variable oscillators. Each oscillator includes a summer, two multipliers and two integrators. Different inputs (derived from computer 8) are fed to the multiplier pair of each oscillator. In the case of solenoid valve 16, the valve is opened as a function of range and the oscillator associated therewith is called range oscillator RO. A signal with a frequency $\omega_x$, derived from computer 8, and varying as a function of range, is fed to both multipliers. To simulate a landing approach, for example, $\omega_x$ can be:

$$K_1\left(1 - \frac{x}{x_{RVR}}\right)$$

where $\omega_x=0$ when $x>x_{RVR}$ and $x_{RVR}$ is the runway visual range encountered on the ground according to the conditions for Category I, II, etc. The output from the oscillator associated with solenoid valve 17 varies as a function of altitude and is called altitude oscillator AO. The multipliers of AO are fed a signal with frequency $\omega_z$, which varies as a function of altitude and is generated by computer 8. To simulate an approach, for example, $\omega_z$ could be:

$$\omega_z = K_2\left[1 - \frac{z - 100}{(1000 + x_{RVR})\tan\gamma}\right]$$

where $z_{RVR}=(1000+x_{RVR})\tan\gamma$ and $\gamma$=aircraft flight path angle $\omega_z=0$ when $z-100>z_{RVR}$ and $z_{RVR}$ is the desired breakout altitude corresponding to the selected Category I, II, or other criteria. The values $K_1$ and $K_2$ are selected according to whether the fog is to become heavier or thinner as the aircraft descends toward the ground.

To simulate a take-off for example:

$$\omega_x = K_1\left[\frac{x}{x_{RVR}}\right]; \omega_z = K_2\left[\frac{z}{z_{RVR}}\right].$$

The equations for the range oscillator are set forth as follows wherein E is the output of the summer, T is the output of the first multiplier, R is the output of the first integrator, P is the output of the second multiplier, and $x_p$ is the output of the second integrator as well as the RO:

$$E(t)=1-x_p(t)$$

$$T(t)=\omega_x E(t)=\omega_x[1-x_p(t)]$$

$$R(t)=\int T(t)dt=\int \omega_x[1-x_p(t)]dt$$

$$P(t)=\omega_x R(t)$$

$$x_p(t)=\int P(t)dt=\int\int \omega_x^2[1-x_p(t)]dtdt$$

Using the Laplace operator on the last equation:

$$x_p(S) = \frac{\omega_x^2}{S^2}[1/S - x_p(S)]$$

-continued $$S^3 x_p(S) = \omega_x^2[1 - Sx_p(S)]$$

$$x_p(S) = \frac{\omega_x^2}{S(S^2 + \omega_x^2)}$$

Converting back to the time domain:

$$x_p(t)=1-\cos\omega_x t$$

The equations for the other five oscillators are the same except for the nomenclature of the multiplier input signal. In the case of the altitude oscillator, the multiplier input signal is $\omega_z$ rather than $\omega_x$ and the output signal is $z_p$ instead of $x_p$, etc. The oscillators can be fabricated with analog components; however, it is much easier to program the oscillator equations on computer 8 or a separate mini-computer.

Digital-to-analog converter unit 9 is comprised of a plurality of converters 9a, 9b and so forth. Likewise, amplifier unit 10 features a number of amplifier sections 10a, 10b and so forth each capable of amplifying a separate signal.

From the equations above, it is clear that RO generates a signal $x_p=1-\cos\omega_x t$ and AO generates an output signal $z_p=1-\cos\omega_z t$. The output $x_p$ (which has a peak amplitude of 2) is fed into digital-to-analog converter 9a and the output of the converter is coupled to power amplifier 10a. The amplifier generates a scaled-up d-c voltage which activates solenoid valve 16 at a frequency $\omega_x$. Similarly, AO output $z_p$ is fed to digital-to-analog converter 9b which in turn is connected to power amplifier 10b. When the solenoid valves are energized, air at $P_2$ is admitted into chamber 3 in pulses and aerosol therein is forced to evacuate through pressure relief valves 21 and drain pipe 91. The air pulses cause a mixing action within chamber 3 so that the aerosol density tends to be uniform at all viewing locations.

A more detailed description of this technique can be followed in referring to FIG. 5. The purpose of this figure is to show that the visibility through the environmental effects chamber 3 can be made to vary as the density of the fog is changed with altitude and range and as a function of the oscillator frequency $\omega_x$ or $\omega_z$. Runway visual range (RVR) can be determined as: $x_{RVR}=(3.41/\alpha_1)$ where $\alpha_1$, is the extinction coefficient due to atmospheric scattering. Ground range to the runway $x=(h/\tan\gamma)$ where altitude h=altitude and $\gamma$=aircraft flight path angle which are available from the computer 8. Therefore, where x is slightly greater or equal to $x_{RVR}$ then $(h/\tan\gamma)\doteq(3.41/\alpha_1)$. Thus, as the aircraft descends through heavy, dense fog with an extinction coefficient $\alpha_1=1.0$/ft, it must change to 0.0025/ft for ¼-mile RVR visibility (Category II) or to 0.0012/ft for ½-mile RVR visibility (Category I). The technique which will naturally allow the correct extinction coefficient and hence the appropriate fog density is to drive more calibrated unsaturated air into the environmental effects chamber 3 which will change the ratio of fog particulate with the new volume of clean air. To further understand this method, the variable frequency oscillators which are used to drive pulsed air into the chamber 3 have a beginning at 300 feet altitude for Category I conditions and $$\omega_z = 3.14\left(1 - \frac{z - 100}{200}\right)$$

or beginning at 200 feet altitude for Category II condition and $$\omega_z = 3.14\left(1 - \frac{z - 100}{100}\right).$$

Figure 5:
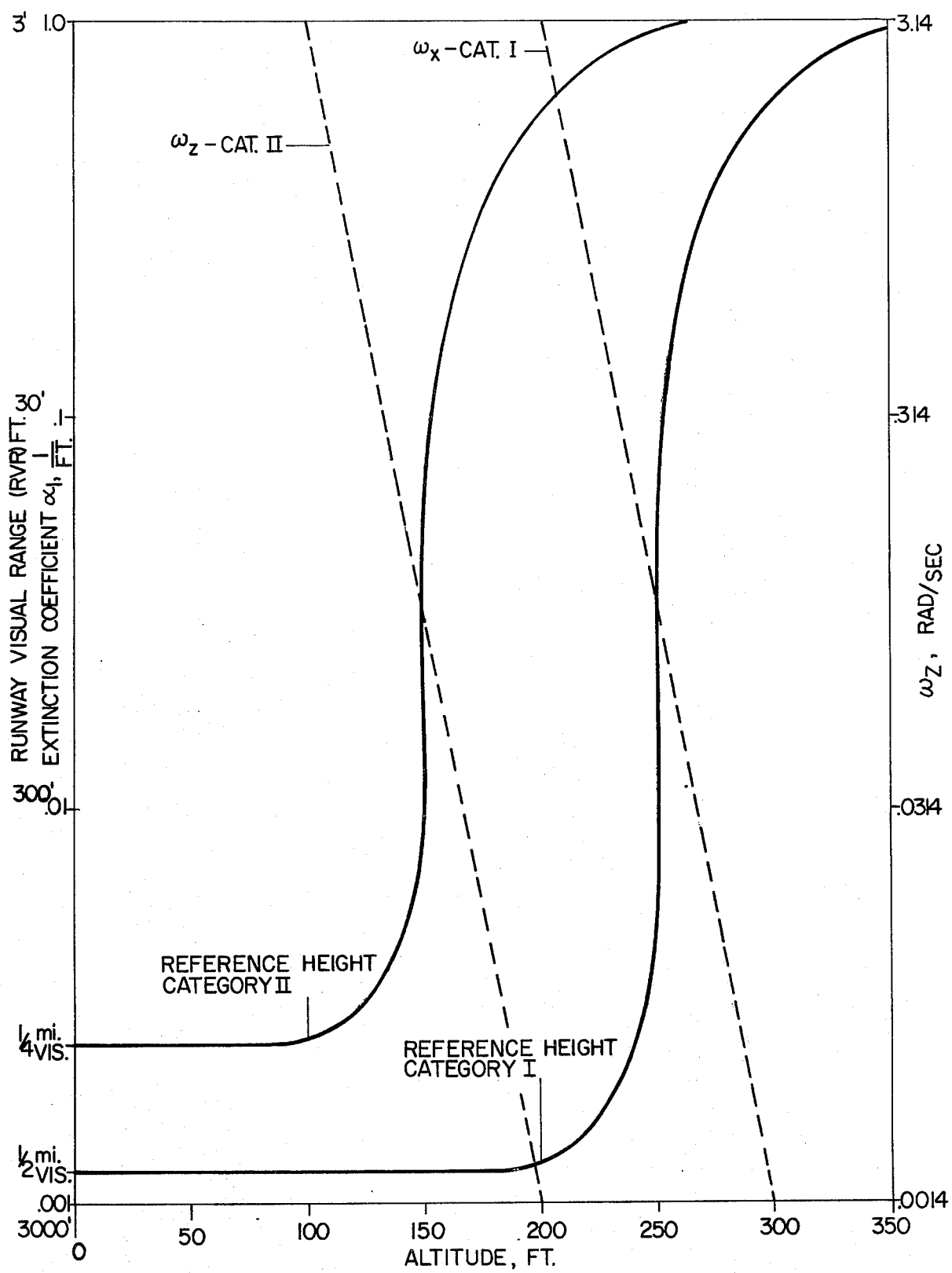
FIG. 5 illustrates the visibility through the environmental effects chamber as a function of fog density for determining terminal area visibility conditions.
Figure 6:
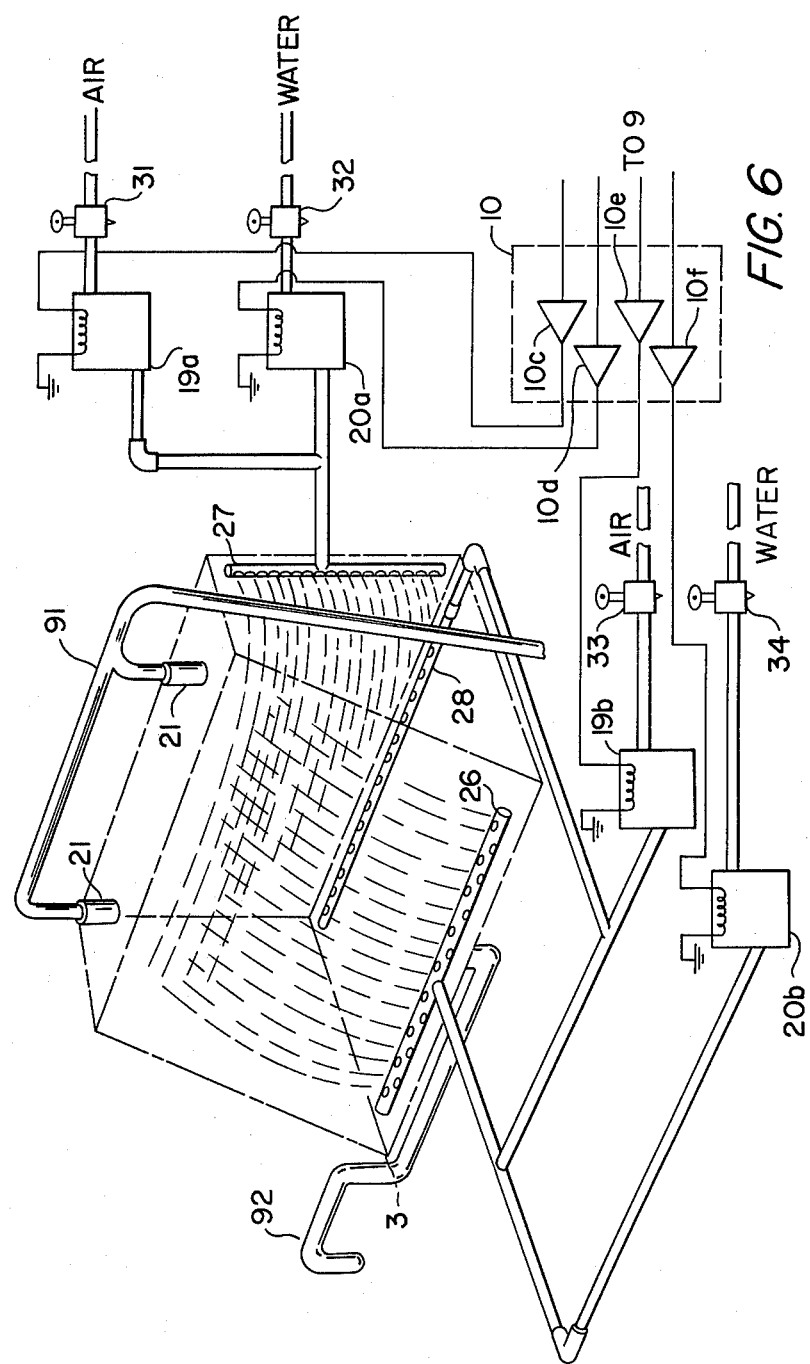
FIG. 6 is a diagrammatic illustration of a control system for the rain generator of the present invention.
Figure 7:
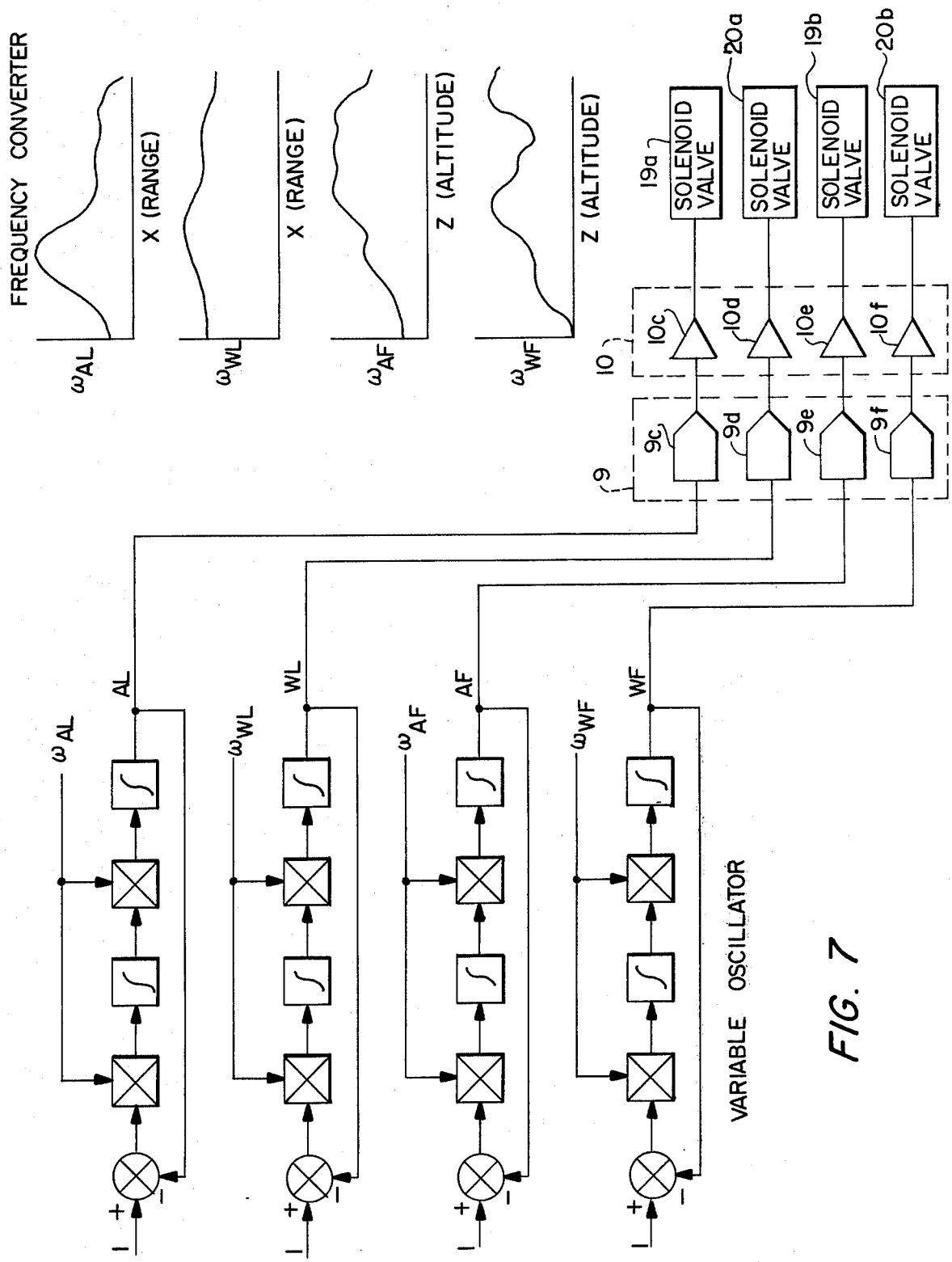
FIG. 7 is a diagrammatic illustration of further details of a control system for activating the rain generator of FIG. 5.
Figure 8:
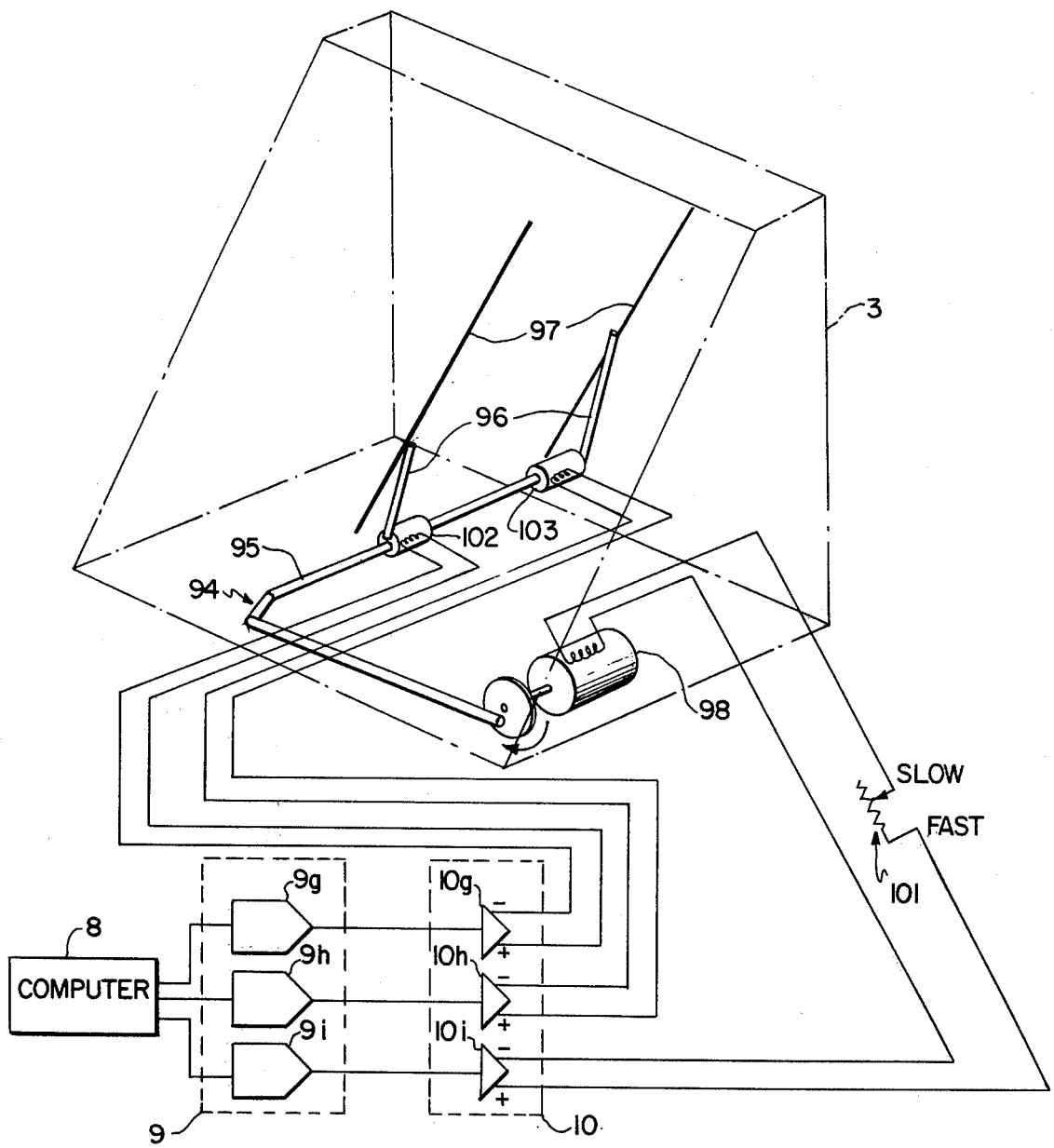
FIG. 8 is a diagrammatic illustration of the windshield wiper system of the present invention.

Similarly, though not shown in FIG. 5, $$\omega_x = 3.14\left(1 - \frac{x}{2800}\right)$$

beginning at 2800 feet range for Category I condition and $$\omega_x = 3.14\left(1 - \frac{x}{1200}\right)$$

beginning at 1200 feet range for Category II conditions. Accordingly, it can be appreciated that as the aircraft approaches both the altitude and range to satisfy the selected terminal area RVR environmental conditions, that the fog density and hence visibility will be appropriately correct for the pilot's final approach maneuver.

The rain generating apparatus of the present invention is illustrated in FIG. 6. The entire area or the major portion of the front and rear panels of chamber 3 are transparent and made of glass or plastic. When an aircraft flies through rain, the rain is generally moved upward and/or laterally across the windshield. Perforated tubes are provided in chamber 3 to direct water in these directions. Tubes 26 and 28 are disposed near the floor and vertical tube 27 is located in a rear corner of the chamber. Both left and right hand versions of vertical tube 27 can be positioned to provide rain effects from both directions singly or bidirectional simultaneously. All of these tubes have either single rows of 1/32" diameter holes or double rows of 1/64" diameter holes along the entire length. Preferably, the tubes are made of metal to withstand the air pressures used. Further, copper is a desirable tube material as it prevents electrolytic action from corroding the orifices shut.

The horizontal tube 26 and vertical tube 27 are both supplied with water at pressure $P_W$ and air pressure $P_A$. These pressures may be further defined as $P_{AL}$ (lateral air pressure), $P_{WL}$ (lateral water pressure), $P_{AF}$ (frontal air pressure), and $P_{WF}$ (frontal water pressure). Only air is ejected from tube 28. The ejected air blows the water drops from tubes 26 and 27 in an upward direction to simulate rain driven upwardly on a windshield. Tube 28 is fed air from the supply for tube 26. The air pressure $P_A$ should always be greater than the water pressure $P_W$, but not so large that it will bleed air into the waterlines. The larger volume of air will fracture the smaller volume of water into a fine spray with an upward velocity from tube 26 and a lateral velocity from tube 27.

Activation of these two rain effect spray systems can be accomplished individually, alternately or simultaneously by computer 8 according to the desired effect through which the simulated aircraft is expected to fly. The control system for activating the rain generator is illustrated in FIG. 7. It is comprised of four separate variable frequency oscillators that each have the same equations as the range oscillator and have an output waveform that is represented by $(1-\cos \omega t)$. The variable frequency signals $\omega_{AL}$ (lateral air), $\omega_{WL}$ (lateral water), $\omega_{AF}$ (frontal air) and $\omega_{WF}$ (frontal water) are each preprogrammed as a function of range or altitude (see the schematic diagrams in FIG. 6) and generated by computer 8. The following variable osicllator outputs Al, WL, AF, and WF are routed through to their respective digital-to-analog converter channels 9*c*, 9*d*, 9*e*, & 9*f*. The converter outputs are then channeled to power amplifiers 10*c*, 10*d*, 10*e*, 10*f*. The outputs of amplifiers 10*c*, 10*d*, 10*e*, 10*f*, are coupled to solenoid valves 19*a*, 20*a*, 19*b*, and 20*b*, respectively. Water supply unit 88 is connected to valves 20*a* and 20*b*, respectively. Air supply unit 89 is connected to valves 31 and 33. The outputs from these valves are directed to solenoid valves 19*a* and 19*b*. Thus, frequencies $\omega_{AL}$ and $\omega_{WL}$ control the lateral air/water emission from tube 27 and frequencies $\omega_{AF}$ and $\omega_{WF}$ control the vertically-directed air/water emission from tube 26.

Water collected on the floor of chamber 3 is permitted to escape the chamber through drain pipe 92. The pipe has a section elevated above the floor of chamber 3. Water is therefore always trapped in a section of the drain pipe and the water prevents aerosol from prematurely escaping chamber 3.

Moisture from both aerosol fog and rain spray will collect upon the front and back transparent panels or windows of chamber 3. This spray will tend to distort the pilot's visual scene as presented on monitor system 1. Most aircraft utilize motordriven wiper blades for removing water film from the windshield although a few aircraft rely on a high velocity air stream for removing water film. Although some window panel cleaning action is provided by the air from tube 28, the principal method for removing water spray and condensate from the chamber windows is accomplished by the use of a tandem windshield wiper system as shown in FIG. 8.

A conventional windshield wiper direct-current motor 98 is connected through a linkage 94 to a shaft 95 with arms 96. As the shaft of motor 98 is rotated, wiper blades 97 move reciprocally across the front and rear transparent panels of chamber 3. A variable resistor 101 controls the speed of motor 98. Electrically controlled magnetic clutches 102 and 103 permit the wipers to be operated singly or in tandem. The rain spray can be controlled within the environmental effects chamber 3 so that only one window is covered with a water film. Under these circumstances, one wiper blade can be engaged to remove this water film and the other wiper blade can be moved out of view of pilot 12. Selection and voltage activation of motor 98 and clutches 102, 103 is controlled by use of digital computer 8 commands which provide low current output signals for digital-to-analog converters 9*g*, 9*h* and 9*i*. The analog output signals from these converters are amplified by power amplifiers 10*g*, 10*h*, and 10*i* and sent to magnetic clutches 102, 103 and windshield wiper motor 98.

The apparatus for supplying aerosol particulate to the environmental chamber 3 is shown in FIGS. 9A to 9G. Four aerosol generator variations are depicted in FIGS. 9A to 9D. In FIGS. 9A, 9B and 9C a small ½-inch diameter and ½-inch length cylinder 37 is shown with a narrow 1/64-inch slit 105 across its face (except for FIG.

9C where the slit has been widened to 1/32"). The cylinder serves as a plenum chamber. In FIGS. 9A and 9B the chamber is supplied with air whereas in FIG. 9C water and air are both fed to the chamber; and the air pressure is equal to or greater than the water pressure. In FIGS. 9A and 9B a stream of water is directed over the slit 105 in the plenum chamber 37. The stream is directed by means of a tube 38 with a ¼-inch diameter. A water impervious collar 39 forms a U-shaped fence around the slit and guides the water from tube 38 to the slit 105.

Generally, water will not spread evenly over the surface of plastic. If plenum chamber 37, tube 38 and collar 39 are made of plastic, the water flow areas (including the interior of tube 38) should be sanded to spread the surface tension and capillary action so that uniform water flow will be promoted. Located in front of the slit 105 of the plenum chamber 37 is either a deflector 106, comprising a sphere 40 supported by a movable pedestal (FIG. 9A), or a plurality of parallel disposed screens with a 30 to 50 mesh size. As the air from the split 105 meets the water flowing thereover, the water is dashed against the sphere 40 or screens 41 and broken up into fine particles that form an aerosol within the environmental effects chamber 3.

In the arrangement of FIG. 9D the plenum chamber is eliminated. Instead, air is passed through a manifold 42 comprising a plurality of commonly joined tubes with exhaust orifices 107. The ends of the exhaust orifices are rigidly fastened to plate 108. Screens 41, with a 30 to 50 mesh size, are suspended over the submerged orifices 107. As air is blown from the submerged exhaust orifices, water is forced against the screens where it is fractured and refractured whereby aerosol is generated. The superior arrangement of FIG. 9D is preferred as it generates more aerosol than the arrangements of FIGS. 9A, 9B and 9C. The arrangement of FIG. 9D generates more aerosol when only the exhaust orifices are submerged. In addition, this arrangement will continue to generate superior aerosol when operating on moving-base motion simulators, since the design allows the orifices to be covered with water at all times, whereas the other arrangements are highly subject to an interruption of aerosol particularly when used on motion simulators.

Figure 9E:
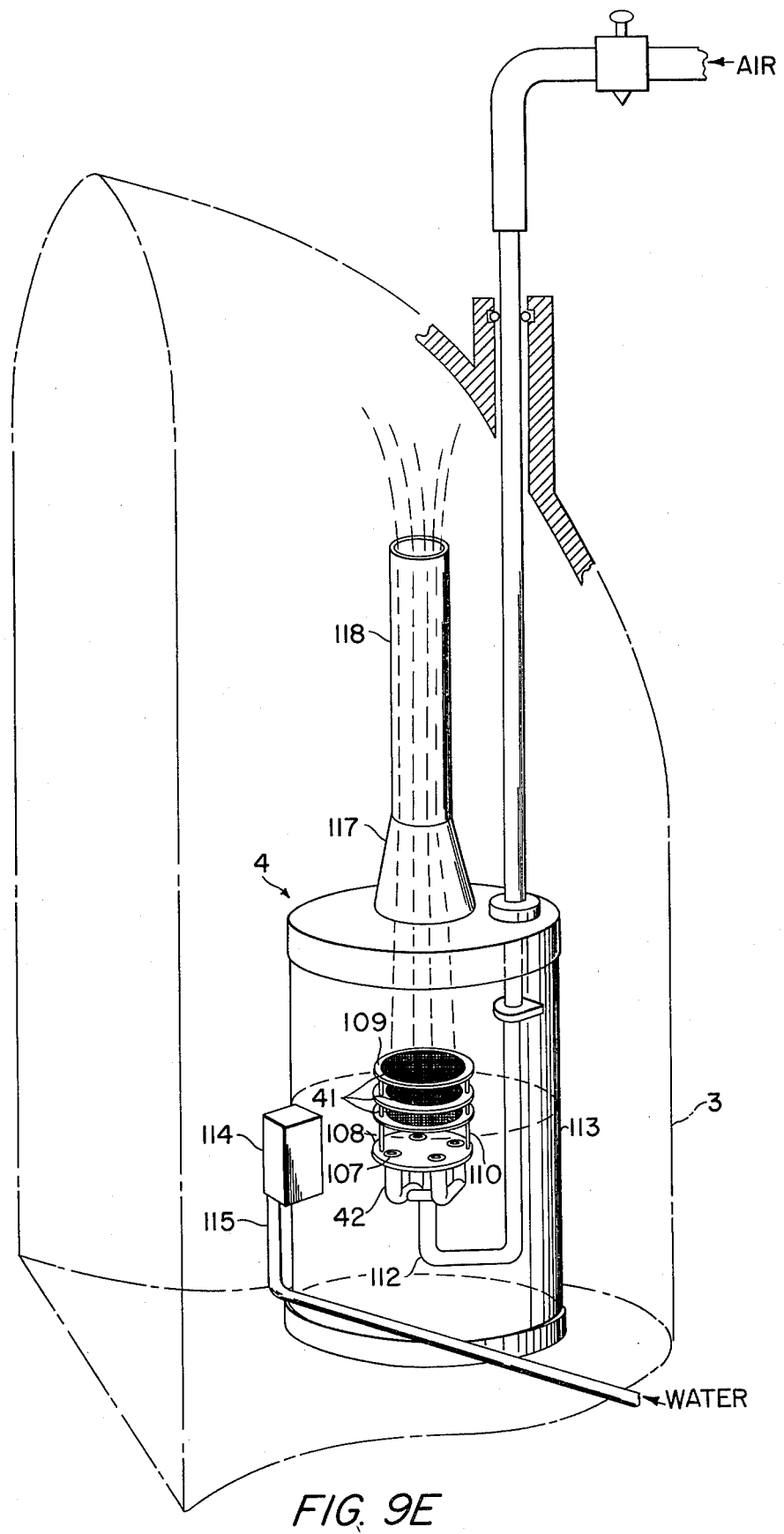
FIG. 9E illustrates the preferred aerosol generator of FIG. 9D disposed in the environmental effects chamber of the present invention.
Figure 9F:
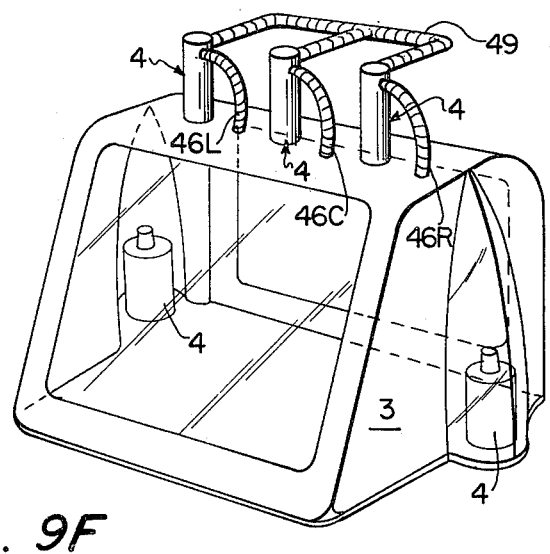
FIG. 9F illustrates how the primary aerosol generators are disposed in alcoves in the walls of the environmental effects chamber.

FIG. 9E depicts an aerosol generator 4 employing the preferred particulate apparatus of FIG. 9D. Preferably, two main internal generators 4 are located within chamber 3 and three auxilary generators 4 are situated atop chamber 3 as shown in FIGS. 1, 2A and 3. FIG. 9F shows how the primary aerosol generators are situated inside alcoves of chamber 3. Referring to FIG. 9E, screens 41 are peripherally supported by rings 109 and spaced from each other and plate 108 by means of posts 110. Manifold 42 is supported by rigid air supply tube 112. The manifold is situated in a cylindrical container 113 that is preferably made from transparent plastic. Leveler 114 obtains water from supply 88 via line 115 and maintains the water level inside container 114 at a desired height. Leveler 114 can simply be a float-actuated valve. Manifold 42 can be moved vertically so that the amount of submersion of orifices 107 can be varied. O-rings surround and seal tube 112 where it passes through the top of container 113 and chamber 3. Water particles jetted through screens 41 are permitted to escape container 113 via a frusto-conical shaped nozzle 117 and a tube 118. Tube 118 is removably detachable from nozzle 117. When tube 118 is detached from nozzle 117, small and large water particles are ejected from container 113 to the interior of chamber 3. It has been found that large size water particles have great difficulty escaping the vertical tube 118, and as a result only small water particles are emitted from tube 118. Thus, nozzle 117 may be used for generating water particles of the size associated with clouds, and tube 118 may be added to nozzle 117 for generating aerosol of the type found in fog.

FIG. 9G is a schematic diagram showing how the air to the aerosol generators 4 is supplied and controlled. Only the aerosol generators stationed atop chamber 3 are illustrated in FIG. 9G. The aerosol from the generators is carried from nozzles 117 by flexible tubes 46L, 46C, and 46R, respectively.

The other ends of tubes 46L, 46C and 46R terminate at the right, center and left environmental effects chamber 3 intake ports 47L, 47C and 47R respectively, situated atop chamber 3. The manifold 42 in each generator 4 is preceeded by an adjustable air valve 43A, 43B, 43C, 43D or 43E. Pressurized air from supply 87 reaches these valves after solenoid valve 18 is opened. Slightly different air pressures may be used to optimize or balance aerosol production. Differential pressures tend to back up the particulate in the generator with the lowest air velocity and pressure. Therefore, a pressure equalizing network comprising manifold 49 and valves 48A, 48B and 48C is connected to ports in containers 113 and enables fog to be exchanged between generators.

Aerosol production is controlled by digital computer 8. The computer monitors the position of the aircraft in terms of its range x and altitude z. At predetermined ranges and altitudes computer 8 provides range and logic signals to OR gate 80. The gate output signal is then converted to an analog voltage by digital-to-analog converter $9j$ and then fed into a power amplifier $10j$ for activating solenoid air valve 18.

Depth Cueing Correction System

When a motorist negotiates a curve on a remote country road in the dead of night and suddenly meets an automobile whose headlights are on "high" beams it is difficult for the motorist to discern a person who is pedalling a bicycle on the shoulder of the road next to the oncoming automobile. The luminance of the lights of the oncoming vehicle greatly exceeds the luminance of the cyclist and makes it difficult, if not impossible, for the motorist to discern the cyclist. This situation is analogous to what a pilot encounters when landing an aircraft in fog in the daytime. The sunlight falls on the fog or cloud and produces intense scattering of light. The luminance of the fog greatly exceeds the luminance of the landing field and makes it difficult for the pilot to discern the runway. The scattered light from the fog veils or obscures the view of the pilot. As used herein, veiling luminance refers to the luminance of fog or clouds bathed in ambient light produced by the sun, moon, stars or lightning.

As a pilot makes a landing approach while passing through a cloud or fog, the luminance of the view or display scene before him (the overall scene not the runway by itself) obeys the following equations:

$$T_B = e^{-\alpha_1 x} + e^{-\alpha_2 x} \tag{1}$$

Where: $T_B$ = atmospheric attenuation
$x$ = aircraft range from pilot eye to ground scene element or $x = (h/\tan \gamma)$ where $\gamma$ = aircraft flight path angle; $h$ = altitude $\alpha_1$ = scattering coefficient of the airborne particulates $\alpha_2$ = absorption coefficient of the airborne particulates $$B_R = B_O T_B + B^* \qquad (2)$$

$B_O$ = display scene luminance $B^* = B_Q 1 - e^{-(\alpha_1 + \alpha_2)x}$ = veiling luminance due to ambient light on the airborne particles $B_Q$ = ambient luminance (sun, moon, stars or lightning)

Combining equations (1) and (2) and solving for the total luminance of the display scene ($B_R$) as seen by the pilot during daylight maneuvers:

$$B_R = B_O(e^{-\alpha_1 x} + e^{-\alpha_2 x}) + B_Q 1 - e^{-(\alpha_1 + \alpha_2)x} \qquad (3)$$

The first term in equation (3) pertains to the luminance of the ground scene. The airborne particulates absorb and scatter the ground scene luminance and the attenuation varies as a function of range and particulate density. Of course, if the range were zero (the pilot's eyes were touching the ground scene) there would be no attenuation and $B_O$ would be maximum. The second term in equation (3) describes the veiling luminance of the airborne particulates. In this instance when range is zero, the pilot has no water particulates to peer through and the veiling luminance is zero. As the ground scene increases, so does the scattering of ambient light by the fog. Thus, veiling luminance increases with the distance through the fog from the pilot to the ground scene. The equation (3), if x is zero or if no airborne particulates are present (irrespective of x) B* is zero. Referring back to the automobile/bicycle example, the luminance of the cyclist is sort of like $B_O T_B$ and the luminance of the high beam headlights may be compared to B*.

Conventional aircraft simulators with cathode ray tube displays can only simulate the $B_O$ factor of equation (3). They have no provision for simulating atmospheric attenuation (resulting from scattering and absorption) and veiling luminance. In the past, attempts were unsatisfactorily made to simulate fog by reducing the contrast of a scene on the CRT. When a runway approach is made under unrestrictive visibility conditions, the scene normally viewed by the pilot should actually be brighter in the near field than in the far field at the horizon. Obviously, when an approach to the runway is made under foggy or cloudy conditions, the nearest end of the runway should still be seen first through the foreground fog and be visible to the pilot before he can see the far end. Before touchdown on the runway, the landing approach lights should appear brighter than the runway edge lights as they are closer to the descending aircraft. Conventional simulators produce inverse luminance scenes that are brighter by a ratio of about 5:1 at the horizon than in the near field (at the bottom of the television monitor). These monitors consequently present incorrect or contradictory visual cues and hence deceive the pilot. This condition is aggravated, not improved, when real fog is placed in front of the display.

Figure 10:
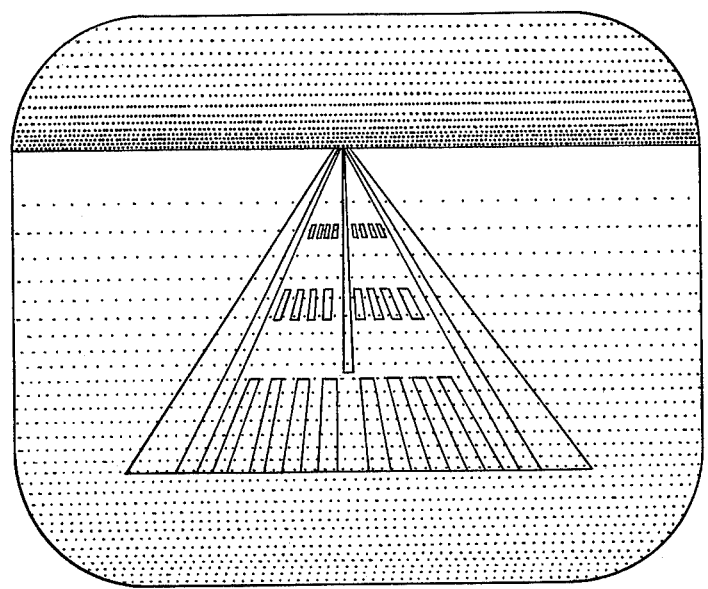
FIG. 10 illustrates how conventional CRT simulators reverse the luminance cues, namely, uncorrected depth cueing scenes.

FIG. 10 depicts a landing approach scene in a fog-free environment as viewed on a conventional simulator CRT. Note that the scene is brighter at the horizon than it is in the near field.

Figure 11:
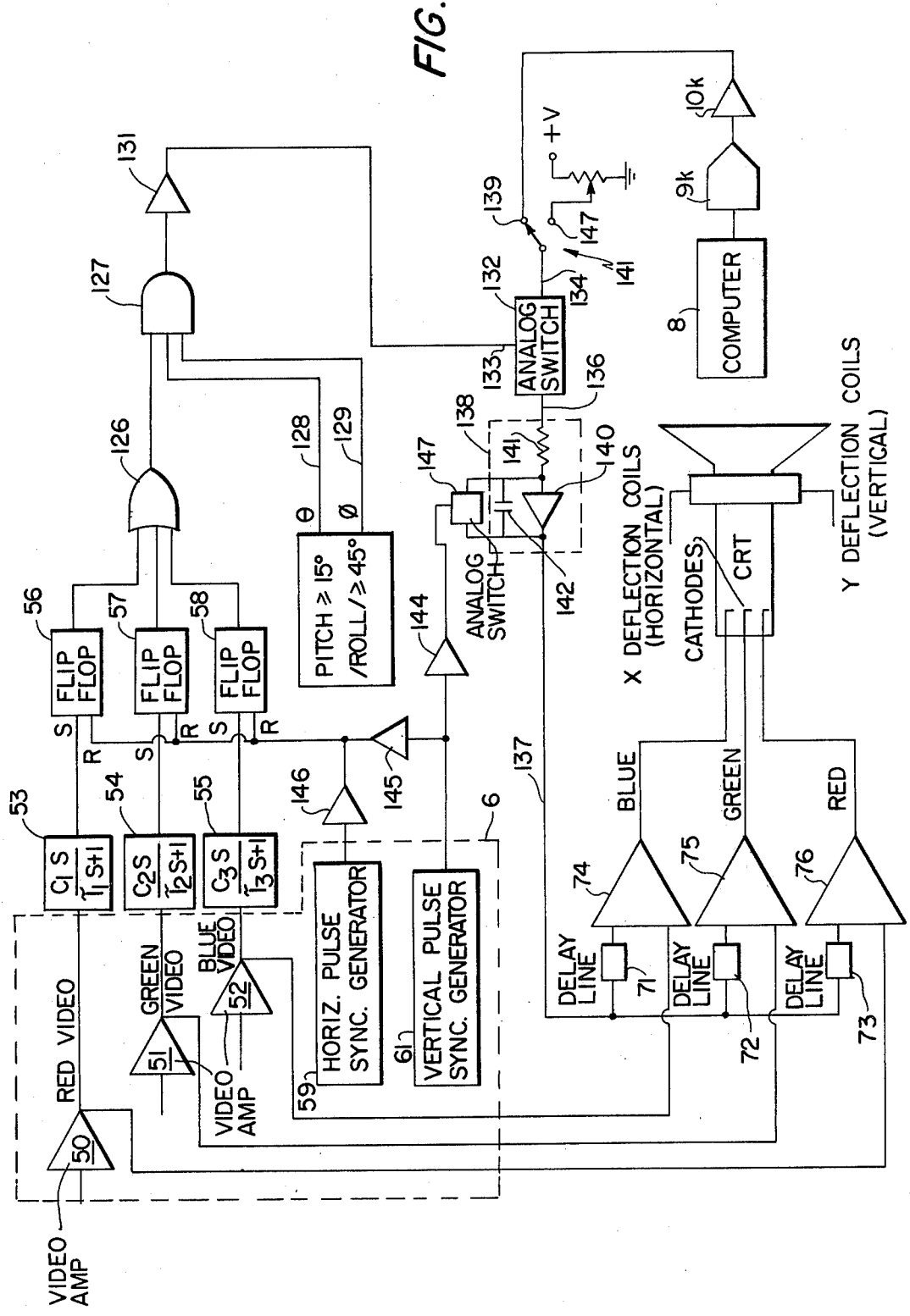
FIG. 11 is a control schematic of the television depth-cueing correction system of the present invention.

A means for overcoming the inverse luminance problem and for producing a proper depth cueing effect is shown in FIG. 11. This circuit monitors the output of TV camera 6, notes the horizon demarcation, and changes the level of the video signals so that the luminance of the scene below the horizon is correctly displayed on the CRT monitor 1. The red, green and blue video signals from amplifiers 50, 51, and 52, respectively, in TV camera 6 are passed through differential filters 53, 54, and 55, respectively. These filters remove the video black level bias signal. Accordingly, when the raster is above the horizon (in the sky portion) a zero level video signal is produced. The outputs of filters 53, 54 and 55 are coupled to the "set" inputs of flip-flops 56, 57 and 58, respectively. As soon as the downward moving raster reaches the horizon, a video signal is generated having an amplitude greater than zero and one sufficient to toggle the flip-flop. The outputs of the flip-flops are coupled to three-input OR gate 126. Computer 8 monitors the pitch and roll status of the aircraft. As long as the pitch $\theta$ is less than 15° a "one" or high logic signal is routed to one input of AND gate 127. Whenever the pitch is equal to or greater than 15° or when only the sky is presented on the monitor, a 0 or low logic signal is sent to AND gate 127 on lead 128. Similarly, as long as the absolute value of the roll is less than 45°, a high logic signal is fed to AND gate 127 on lead 129. The output of OR gate 126 is connected to the third input of AND gate 127. The output of AND gate 127 passes through buffer amplifier 131 before reaching the control input of SPST analog switch 132. Analog switch 132 may be, for example, an FET or an integrated circuit analog switch manufactured by Siliconix, Incorporated, Santa Clara, California. When a high level signal is applied to lead 133, an electrical path is completed between leads 134 and 136. Conversely, the switch is open and the electrical path is interrupted when a low level signal is imposed at control lead 133.

The red, green and blue video signals from amplifiers 50, 51, and 52, respectively, are fed to amplifiers 74, 75, and 76, respectively. The video signals are amplified as a function of the signal on lead 137 generated by integrator 138 (comprising op amp 140 resistor 141 and capacitor 142).

Digital computer 8 is programmed to generate a depthcueing correction signal the amplitude of which varies as a direct function of altitude z and inversely as a function of range x. The digital signal is converted to an analog signal in converter 9k and amplified by amplifier 10k before going to terminal 139 of SPDT switch 141.

In operation, when the raster of TV camera 6 is scanning the sky, the inputs and outputs of flip-flops 56, 57, 58 are logical 0's. As soon as the raster reaches the horizon and one of the filtered video signals increases from the zero level, the particular flip-flop involved toggles and the output changes to the high or logical 1 level. The 1 is seen at the input of AND gate 127. If the pitch and roll are within the predetermined limits, 1's are also produced on leads 128 and 129. All three input 1's are ANDed in gate 127 and a 1 is sent through buffer 131 to the control input of analog switch 132. This 1 closes the switch and enables the depth-cueing correction signal to be integrated by integrator 138. When switch 132 is closed, an integrated signal is emitted from integrator 138 on lead 137. The amplitude of the signal starts at zero and increases with time. The integrated signal is passed through variable delay lines 71, 72, and 73 to amplifiers 74, 75 and 76, respectively; and the amplification of the red, green, and blue video signals from video amplifiers 50, 51, and 52 is increased as a function of the delayed signal. The amplified signals leave amplifiers 74, 75, 76 and go to the cathodes of the CRT monitor 1.

Approximately every 16.6 ms, at the end of a frame, a pulse from vertical pulse synchronization generator 61 in camera 6 passes through buffer amplifier 144 and causes analog switch 147 to close and short capacitor 142 of integrator 138. The same pulse from generator 61 also passes through buffer amplifier 145 and resets flip-flops 56, 57, 58. When the flip-flops are reset, logical 0's are fed to OR gate 126 and analog switch 132 is opened. Of course, with capacitor 142 shorted and switch 132 open, no signal appears on lead 137 and the red, green and blue video signals are subjected to unaltered, standard amplification by amplifiers 74–76. Pulses are generated by the horizontal pulse synchronization generator 59 when the raster reaches the end of a line, i.e., every (16.6 ms/262.5)=63.2 ms. These pulses are channeled through a buffer amplifier 146 to the reset inputs of flip-flops 56–58. When the flip-flops are reset, the output of gates 126 and 127 is at logic level 0 and switch 132 is opened. Thus, when the raster is below the horizon, the flip-flops are set most of the time. They are only reset for the period of the reset pulses. The opening and closing of switch 132 causes the integration process to be periodically interrupted. Therefore, each time the switch is opened, the output signal from integrator 138 develops a step. The output signal has the appearance of a staircase waveform. Once a staircase waveform is started, it continues until the end of the frame is reached and switch 147 shorts capacitor 142. Anytime that the pitch $\theta$ exceeds 15° or the absolute value of the roll exceeds 45° or the camera views all sky, analog switch 132 will be opened by the 0 logic level at the output of AND gate 127.

The operation of the gates and switches takes a finite time. Adjustable delays 71–73 enable the integrated signal to be fed to amplifiers 74–76 in line synchronization with the video signals from amplifiers 50–52. In the event that one wishes a depth-cueing signal that is not a function of range and altitude or if one desires a calibration signal, switch 141 is moved to position 147 and a portion of voltage +V is fed to integrator 138 when switch 132 is closed. It is apparent from the above discussion that the depth-cueing correction circuit causes a gradual increase in scene luminance from the horizon to the bottom of the display scene. Maximum brightness occurs at the bottom of the scene as it is actually perceived in real life.

Veiling Luminance

Figure 12:
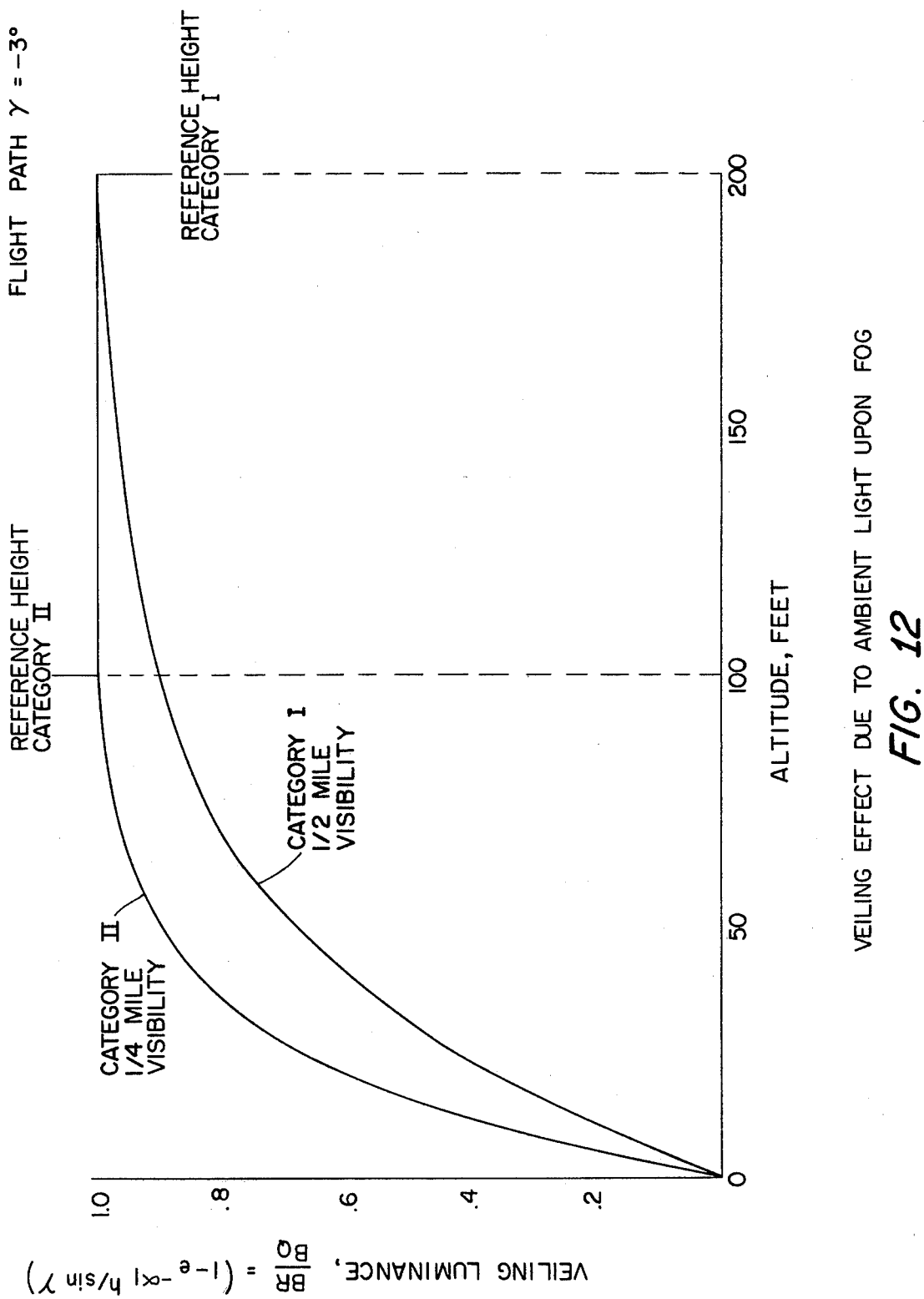
FIG. 12 illustrates the veiling effect due to ambient light on fog.

The veiling luminance as presented in equation 3 of the previous discussion arises from the presence of ambient light, principally sunlight, which falls upon the fog or cloud and produces intense scattering of light. In order to accommodate this effect correctly in the environmental effects chamber 3, it is necessary to determine the effect of altitude, flight path angle, and extinction coefficient or density as they appear as variables within the veiling effect expression of equation 3. Referring to FIG. 5, two values of the extinction coefficient for the Terminal area Category I and II visibility conditions are shown to be 0.0025/ft and 0.0012/ft respectfully. These values, when applied to the veiling portion of equation 3 at the appropriate Category I and II altitudes of 100 ft. and 200 ft., respectfully for a flight path of −3 deg., show in FIG. 12 the following results: (1) For the Category II condition, the light scattering luminance will be maximum and will fall off to about 60% maximum at 20 feet altitude; (2) For the Category I condition, the light scattering at 100 ft. will be 90% of the original value it was at 200 ft. and 60% at 40 ft. altitude. The foregoing results show that the background display scene (presented on the television monitor 1 for daylight flights) will be obscurred by the fog, and thus from viewing by the pilot for a typical Category II condition by about 40 feet more altitude when compared to the Category I condition. It is possible, though, that the extinction coefficient or fog density can change abruptly at different altitudes and it will be appreciated that this invention has the means as discussed earlier to change or pre-program the density of the fog within the environmental effects chamber 3.

In referring back to FIG. 3, a veiling luminance light 90 has been placed in the space between the top of the environmental effects chamber 3 and the face of the display monitor 1. The veiling light 90 will be used principally with monitor 1 during daylight or semi-daylight operation. The environmental effects chamber 3 has been especially designed to accommodate this veiling light and hence, to produce the right effect when the pilot 12 observes the visual scene VS through the collimating lenses 2. The ambient light is produced from a lamp such as a Xenon of fluorescent type which contain a similar sunlight spectrum. This veiling light 90 with the proper initial brightness will illuminate the fog particulate within the environmental effects chamber 3 through the front inclined window face and will produce a uniform and collimated bright scattering effect which when observed by the pilot 12 will look not only brighter, but also much more dense. Since it has previously been demonstrated that the fog density can be controlled as a function of altitude according to FIG. 5 and that the veiling luminance should also change with altitude as shown in FIG. 10, it can be realized that the bright veiling luminance will automatically become less intense as the aircraft descends or as the fog density is reduced in the environmental chamber 3. The scene then observed by the pilot 12 as the aircraft descends will become dimmer due to less fog particulate in the chamber to scatter the light emanating from the veiling luminance light 90. Finally, when all the fog is removed from the chamber, only the background scene from the display monitor 1 at its own brightness will be observed by the pilot 12. Although the veiling luminance light 90 may still be on, it will not contaminate the display monitor scene. This veiling light 90 can also be programmed by the computer 8 to change brightness levels if desirable, to further produce the effect of the aircraft penetrating through different cloud densities such as would occur for an aircraft descending through a cloud layer.

A further use of this veiling light 90 can be realized for the simulation of lightning effects for night-time flight operations. Since the veiling light 90 has been shown to increase the apparent density of the fog for daylight operations, it can be programmed under computer control 8 to activate the light randomly or intermittently. This intermittent operation will produce a flash of light which scatters light through the environmental effects chamber 3 in a similar manner as would be observed by a pilot 12 for a lightning discharge taking place while passing through a cloud at night. This type of momentary flash blindness to the pilot 12 at a critical time during the aircraft final descent provides valuable pilot training and/or enables others to study the pilot's reactions.

Head-Up Display

Figure 13:
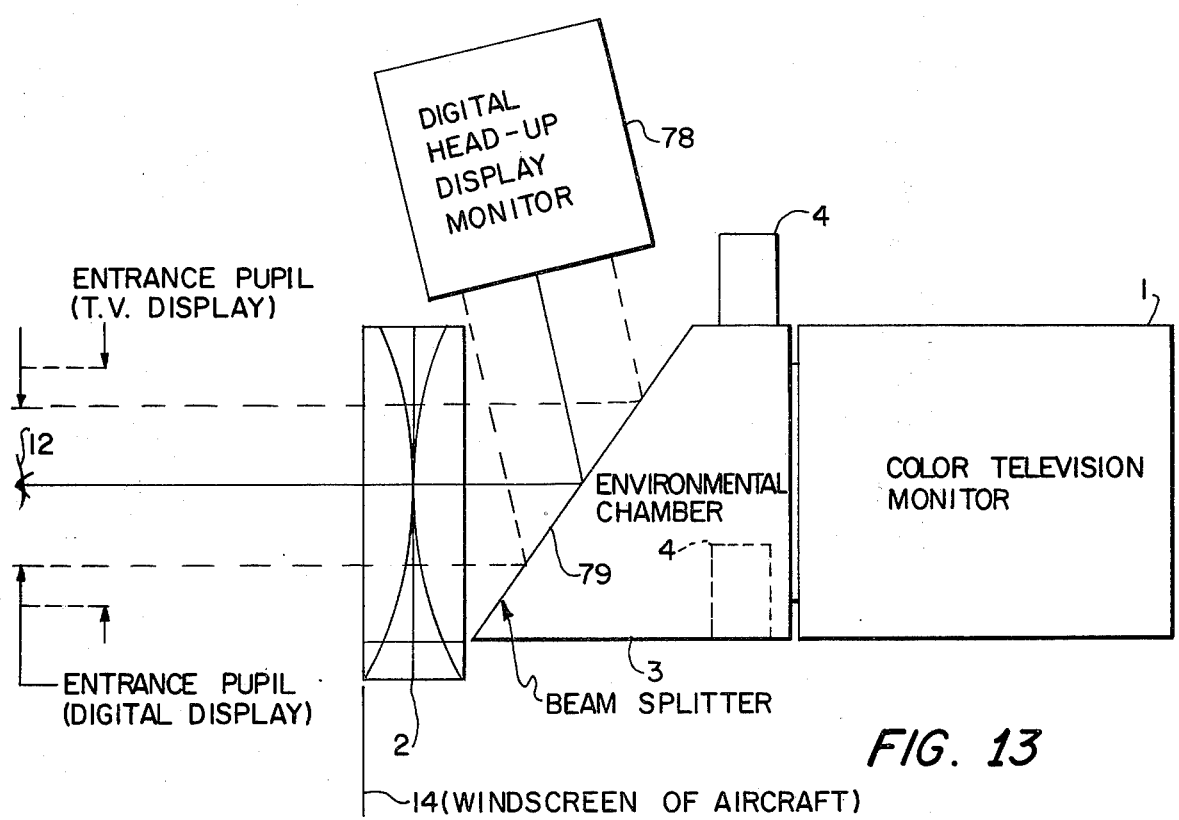
FIG. 13 is a diagrammatic view illustrating the environmental chamber of the present invention in combination with a head-up display.

FIG. 13 shows an arrangement which would allow a synthesized "head-up display" to appear with the background low visibility display scene. Normally, when two pictures or displays are to be combined, a beam splitter is positioned at 45 degrees in the space between the collimating lens and the television monitor. However, due to the unusual shape of the environmental chamber 3, the inclined window of the chamber can be replaced with an appropriate beam splitter 79, thus allowing the chamber to serve a dual purpose: (1) provision for locating and positioning a synthesized external display in front of the primary display; and (2) provision for retaining the low visibility fog/rain effects as part of the primary display as seen by the pilot. For the configuration shown in FIG. 13, the beam splitter 79 combined environmental chamber window 3 may be slightly more inclined than the customary 45 degrees. This effect may be partly rectified by tilting the head-up display monitor at a sufficient angle so as to provide the pilot 12 the largest possible entrance pupil. Even though the entrance pupil may be slightly smaller for the head-up display monitor scene, in this instance it is not considered unusual since most actual hardware head-up display systems are constructed for very small entrance pupils of 10 inches or less.

It should be understood that the system described herein may be modified as would occur to one of ordinary skill in the art without departing from the spirit and scope of the present invention.

It is claimed:

1. Apparatus for visually simulating to a pilot trainee the flight of an aircraft through environmental conditions to an aircraft landing site comprising:
   means accessible to said trainee for enabling said trainee to control the flight of said aircraft;
   means for displaying a color image of said landing site and the terrain adjacent thereto, said displaying means including a color television monitor;
   environmental condition simulation means for dispersing natural water particles into the optical path between said trainee and said image;
   lamp means for directing a controlled amount of light downward on said water particles, said lamp means having a spectra substantially similar to that of the sun;
   optical means for collimating the light from said image and the light scattered from said water particles to enhance the depth effect perceived by said pilot trainee;
   means responsive to said enabling means for controlling the image viewed by said trainee; and
   means responsive to the position of said aircraft relative to said landing site for controlling the amount and size of water particles in said optical path;
   said environmental condition simulating means comprising;
   an environmental effects chamber having two walls having transparent portions disposed in said optical path between said pilot trainee and said image;
   a container with an opening adapted to release water particles into said chamber.
   means for maintaining a supply of water within said container at a predetermined level;
   a manifold submerged in said water and having a plurality of exhaust orifices located near the water surface;
   a plurality of stacked screens located above said water and said exhaust orifices; and
   means for driving air through said manifold and exhaust orifices whereby water particles are jetted through said screens and allowed to escape said container via said opening.

2. Apparatus for visually simulating to a pilot trainee seated in a simulated cockpit with a wind screen an aircraft flight through environmental conditions comprising:
   means for dynamically displaying a color image symbolic of the sky and terrain in front of the windscreen, said displaying means including a color television monitor;
   a collimating lens for said pilot trainee to view said images; environmental condition simulation means disposed between said means for displaying and said collimating lens for introducing water particles into the optical path between said trainee pilot and said image, said environmental condition means including first means for generating water particles simulating fog or clouds and second means generating larger water particles simulating rain, means for automatically changing the amount of each size water particles introduced into said optical path as a function of simulated aircraft altitude and range to a predetermined site, and gas means for purging the smaller water particles from said optical path as a function of simulated altitude and range to said predetermined site;
   means accessible to said trainee for simulating aircraft control movements; and
   electronic means responsive to said simulated aircraft control movements for controlling the image display to said trainee, including means for controlling the image size so as to simulate aircraft motion.

3. The apparatus of claim 2 wherein said displaying means further includes a head-up display.

4. The apparatus of claim 2 wherein said displaying means further includes means for generating a calligraphic image of light sources and means for combining said calligraphic image with said color image.

5. Apparatus as set forth in claim 2 wherein said environmental condition simulation means comprises:
   an environmental effects chamber having two walls having transparent portions disposed in said optical path between said pilot trainee and said image;
   a container with an opening adapted to release water particles into said chamber;
   means for maintaining a supply of water within said container at a predetermined level;
   a manifold submerged in said water and having a plurality of exhaust orifices located near the water surface;
   a plurality of stacked screens located above said water and said exhaust orifices; and
   means for driving air through said manifold and exhaust orifices whereby water particles are jetted through said screens and allowed to escape said container via said opening.

6. Apparatus as set forth in claim 2 wherein a lamp means is provided for selectively illuminating said water particles for short periods so as to simulate lightning.

7. Apparatus as set forth in claim 2 wherein said environmental condition simulation means includes an environmental effects chamber having two walls having transparent portions disposed in said optical path between said pilot trainee and said image and said water particles are generated within said environmental effects chamber; and means for directing a controlled amount of light radiation on said water particles whereby radiation is scattered from said particles and a veiling luminance is produced.

8. Apparatus as set forth in claim 2 wherein said environmental condition simulation means comprises:

an environmental effects chamber having two walls having transparent portions disposed in said optical path between said pilot trainee and said image; and said second means for generating larger water particles includes means for directing at least one array of jets of water between said walls and vertically with respect to a line of sight of said pilot trainee along said optical path, and means for directing an array of jets of water between said walls and laterally with respect to said line of sight of said pilot trainee along said optical path.

9. The apparatus of claim 8 further including means for precluding water accumulation on at least one transparent portion of one of said walls.

10. Apparatus for visually simulating to a pilot trainee the flight of an aircraft through environmental conditions to an aircraft landing site comprising:

means accessible to said trainee for enabling said trainee to control the flight of said aircraft;

means for displaying a color image of said landing site and the terrain adjacent thereto, said displaying means including a color television monitor;

environmental condition simulation means for dispersing water into the optical path between said trainee and said image, said environmental condition simulation means including first means for dispersing fog-size water aerosol and second means for ejecting rain-simulating water droplets, means for separately controlling the amount of aerosol and droplets dispersed in said optical path, and gas means for expelling said aerosol from said optical path, said controlling means and said gas means being automatically responsive to the position of said aircraft relative to said landing site;

means for directing light radiation with a spectra similar to that of the sun on said water particles whereby radiation is scattered from said particles and a veiling luminance is produced;

means for varying the intensity of said radiation as a function of the aircraft altitude;

optical means for collimating the light from said image and the light scattered from said water particles to enhance the depth effect perceived by said pilot trainee; and means responsive to said enabling means for controlling the image viewed by said trainee.

11. The apparatus of claim 10 wherein said displaying means further includes a head-up display.

12. The apparatus of claim 10 wherein said displaying means further includes means for generating a calligraphic image of light sources and means for combining said calligraphic image with said color image.

13. Apparatus as set forth in claim 10 wherein said environmental condition simulation means comprises:

an environmental effects chamber having two walls having transparent portions disposed in said optical path between said pilot trainee and said image; and said second means for ejecting rain-simulating water droplets includes means for directing at least one array of jets of water between said walls and vertically with respect to a line of sight of said pilot trainee along said optical path, and means for directing an array of jets of water between said walls and laterally with respect to said line of sight of said pilot trainee along said optical path.

14. The apparatus of claim 13 further including means for precluding water accumulation on at least one transparent portion of one of said walls.

15. The apparatus of claim 10 wherein said displaying means includes means for detecting the presence or absence of a portion of said image representing a horizon line and means for increasing the intensity of said image progressively from said horizon line to the bottom of said image in response to the presence of said horizon line.

16. The apparatus of claim 15 wherein means are included in said intensity increasing means for altering intensity as a direct function of aircraft altitude and in inverse function of range to a landing site.

17. Apparatus for visually simulating to a pilot trainee the flight of an aircraft through environmental conditions to an aircraft landing site comprising:

means accessible to said trainee for enabling said trainee to control the flight of said aircraft;

means for dynamically displaying a color image of said landing site and the terrain adjacent thereto; said displaying means including a color television monitor;

an environmental effects chamber having two walls having transparent portions disposed in an optical path between said pilot trainee and said image;

fog generator means for dispersing water particles into the optical path between said two walls for simulating natural fog;

lamp means for directing a controlled amount of light downward on said natural fog, said lamp means having a spectra substantially similar to that of the sun;

optical means for collimating the light from said image and the light scattered from said water particles to enhance the depth effect perceived by said pilot trainee; and means for selectively exhausting said fog from said chamber, said exhausting means comprising means for introducing gas into said chamber in bursts at rate $\omega_x$, and means for introducing gas into said chamber in bursts at rate $\omega_z$.

18. The apparatus of claim 17 wherein said displaying means further includes a head-up display.

19. The apparatus of claim 17 wherein said displaying means further includes means for generating a calligraphic image of light sources and means for combining said calligraphic image with said color image.

20. The apparatus of claim 17 wherein $\omega_x$ is a function of the range of the aircraft to the landing site and $\omega_z$ is a function of the altitude of the aircraft.

21. The apparatus of claim 17 wherein $$\omega_x = K_1\left(1 - \frac{x}{x_{RVR}}\right)$$

wherein $K_1$ is a constant, x is the horizontal distance between the aircraft and the landing site, and $x_{RVR}$ is the runway visual range, and $$\omega_z = K_2\left[1 - \frac{z - 100}{(1000 + x_{RVR})\tan\gamma}\right]$$

wherein $K_2$ is a constant, z is the altitude of the aircraft, and $\gamma$ is the aircraft flight path angle.

22. The apparatus of claim 17 wherein said displaying means includes means for detecting the presence or absence of a portion of said image representing a horizon line and means for increasing the intensity of said image progressively from said horizon line to the bottom of said image in response to the presence of said horizon line.

23. The apparatus of claim 22 wherein means are included in said intensity increasing means for altering intensity as a direct function of aircraft altitude and an inverse function of range to a landing site.

24. The apparatus of claim 17 wherein said fog generator comprises:

a water tank with an outlet nozzle for releasing water particles;

an air nozzle array submerged in said water tank and aligned with said outlet nozzle; and means for supplying air at a selected pressure through said air nozzle array to blow water particles through said outlet nozzle into said chamber.

25. The apparatus of claim 24 further including diffuser screen means between said array and said outlet nozzle for breaking up the air-blown particles into smaller particles.

26. The apparatus of claim 24 wherein said air nozzle array comprises a plurality of spaced nozzles connected to a common manifold and said manifold is coupled to said air supplying means.

27. Apparatus as set forth in claim 17 wherein said fog generator means comprises:

a manifold;

means for introducing a mixture of water and air at a selected pressure into said manifold;

outlet means for releasing water from said manifold; and dispenser means adjacent said outlet means for breaking up the released water into particles.

28. Apparatus as set forth in claim 17 wherein said fog generator comprises:

a container with an outlet adapted to release water particles;

means for maintaining a supply of water within said container at a predetermined level;

a manifold submerged in said water and aligned with said outlet, said manifold having a plurality of exhaust orifices located near the water surface;

a plurality of stacked screens located above said water and said exhaust orifices; and means for driving air through said manifold and exhaust orifices whereby water particles are jetted through said screens and allowed to escape said container via said opening.

29. Environmental effects apparatus for use in a vehicle simulator which a display system for generating an image representing the scene in front of the vehicle, said environmental effects chamber being disposed in an optical path between the simulator operator and the image, said environmental effects apparatus comprising:

an environmental effects chamber having two walls having transparent portions disposed in said optical path;

fog generator means for dispersing water particles into said optical path between said walls for simulating natural fog;

lamp means for directing a controlled amount of light downward on said water particles, said lamp means having a spectra substantially similar to that of the sun;

optical means for collimating the light from said image and the light scattered from said water particles to enhance the depth effect perceived by said operator; and means for selectively removing said water particles from said chamber, said removing means including means for injecting bursts of gas into said chamber at a rate controlled by the position of said vehicle.

30. Apparatus as set forth in claim 29 wherein said fog generator comprises:

a container with an outlet adapted to release water particles;

means for maintaining a supply of water within said container at a predetermined level;

a manifold submerged in said water and aligned with said outlet, said manifold having a plurality of exhaust orifices located near the water surface;

a plurality of stacked screens located above said water and said exhaust orifices; and means for driving air through said manifold and exhaust orifices whereby water particles are jetted through said screens and allowed to escape said container via said opening.

* * * * *